June 9, 1931.  H. B. FOULDER  1,809,587
BOTTLE CAPPING AND SEALING MACHINE
Filed April 16, 1929  11 Sheets-Sheet 1

INVENTOR
Henry B. Foulder
BY
Henry Van Arsdale
his ATTORNEY

June 9, 1931. H. B. FOULDER 1,809,587
BOTTLE CAPPING AND SEALING MACHINE
Filed April 16, 1929 11 Sheets-Sheet 2
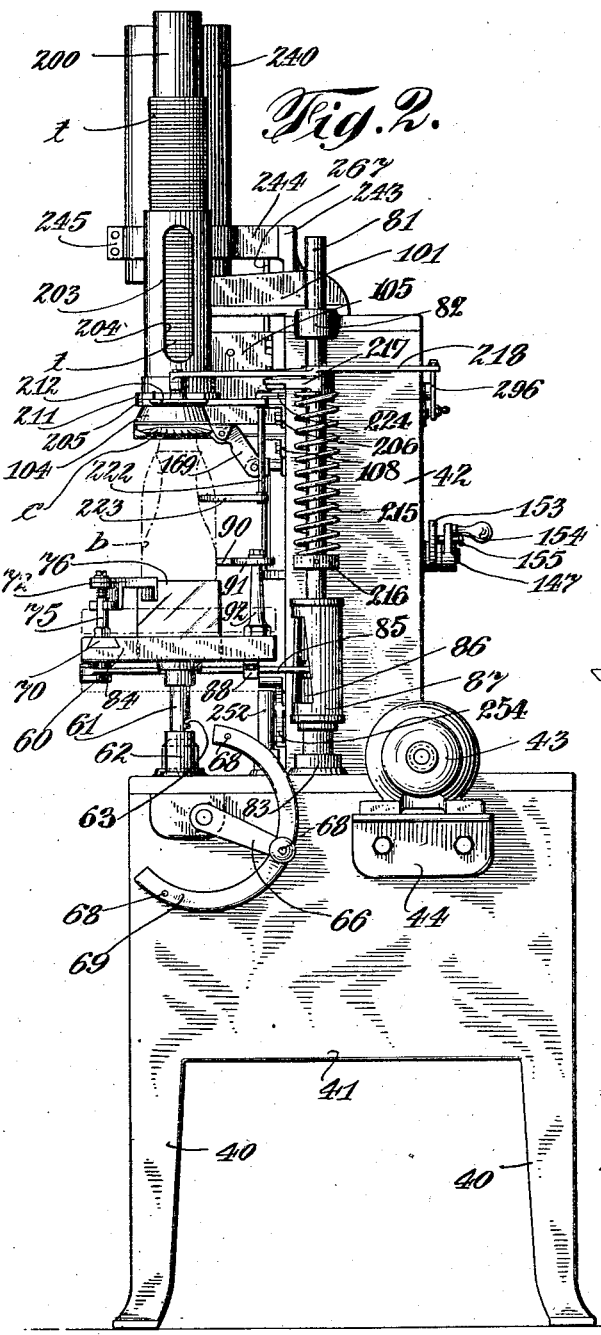
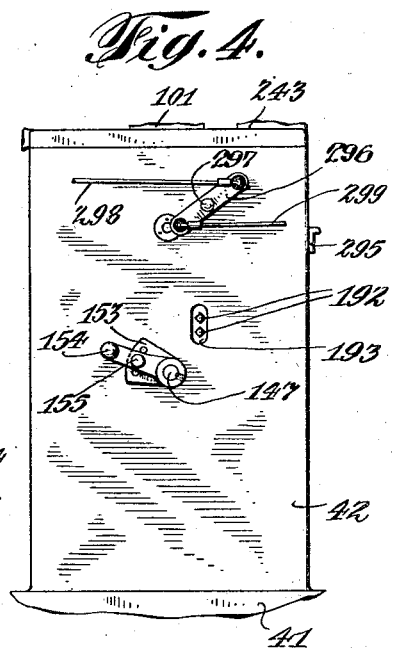
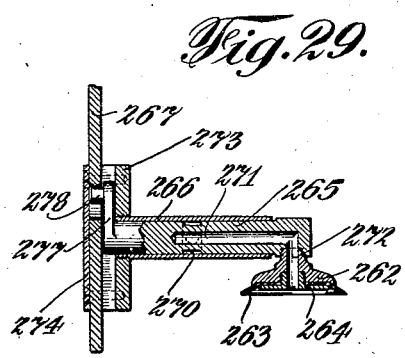
INVENTOR
Henry B. Foulder
BY
Henry Van Arsdale
his ATTORNEY

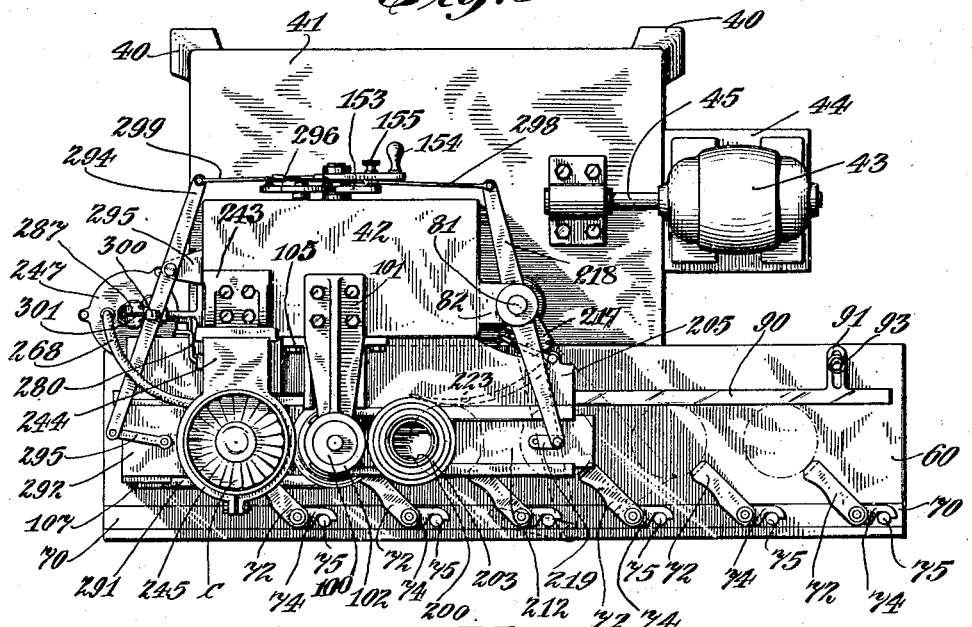
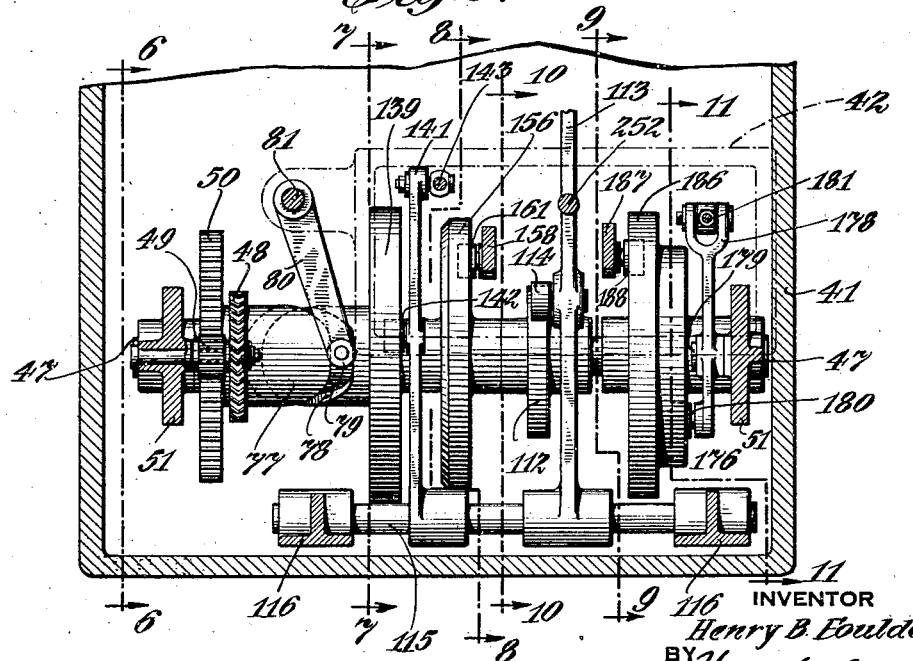

June 9, 1931.  H. B. FOULDER  1,809,587
BOTTLE CAPPING AND SEALING MACHINE
Filed April 16, 1929   11 Sheets-Sheet 4

INVENTOR
Henry B. Foulder
BY
his ATTORNEY

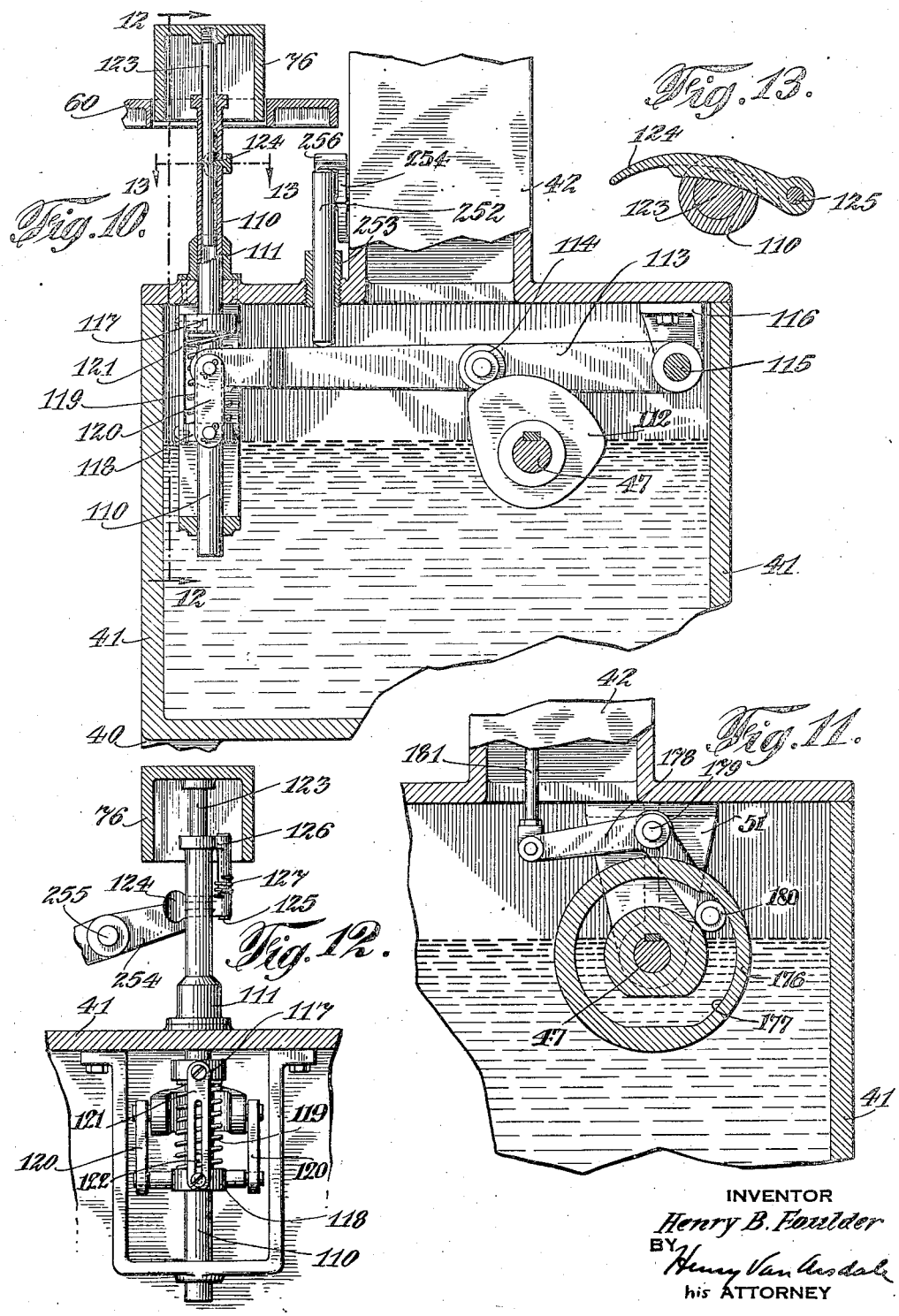

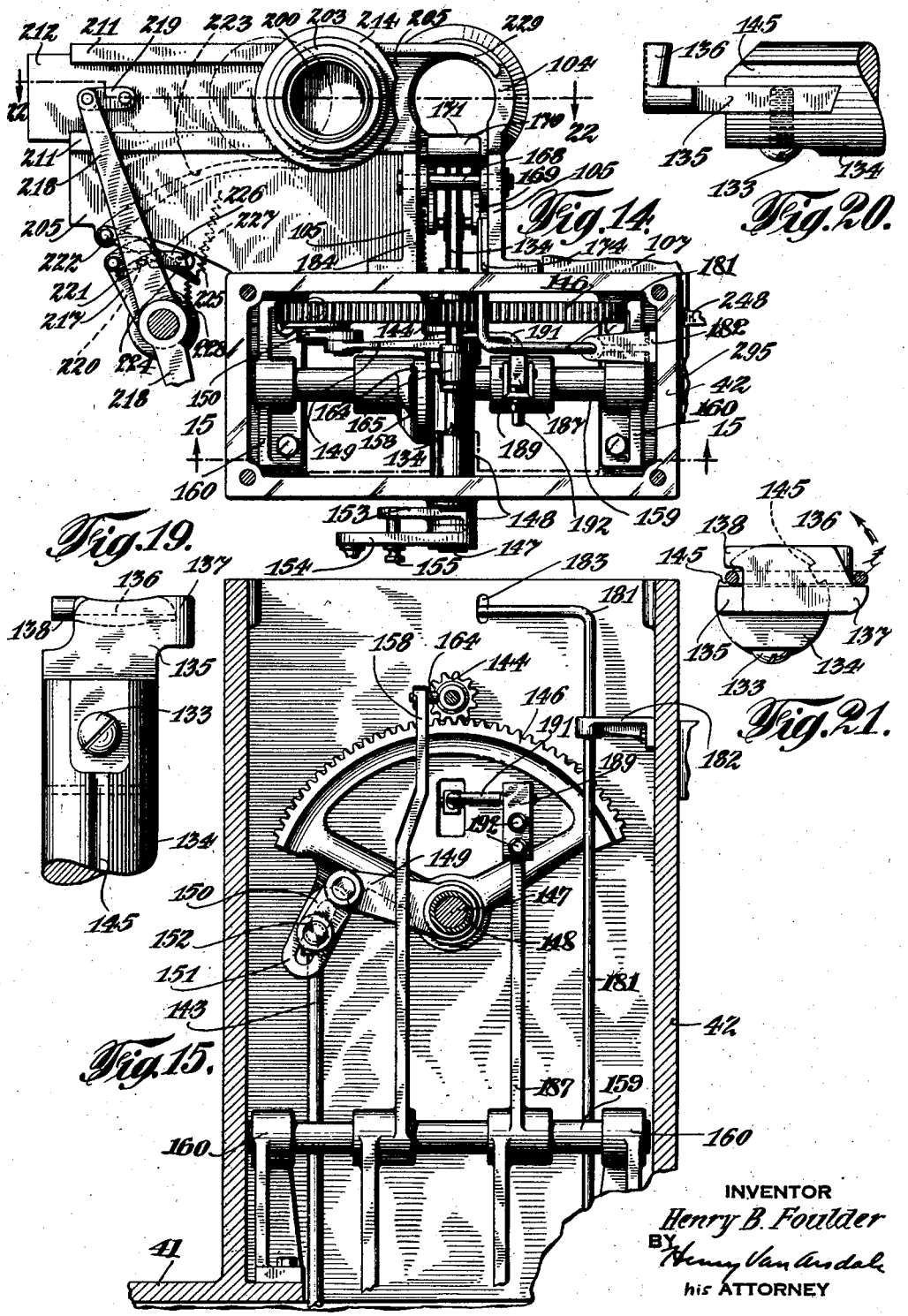

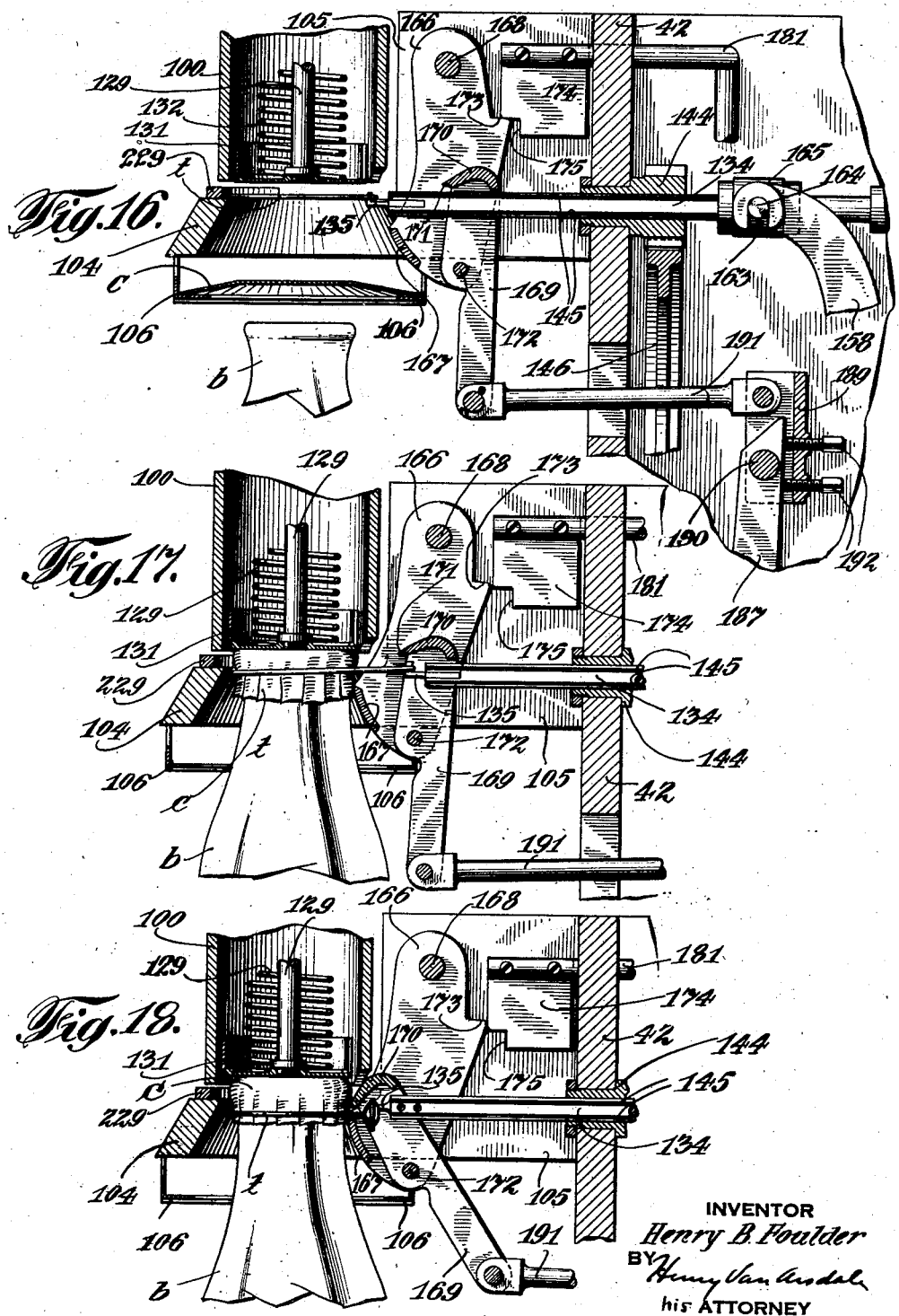

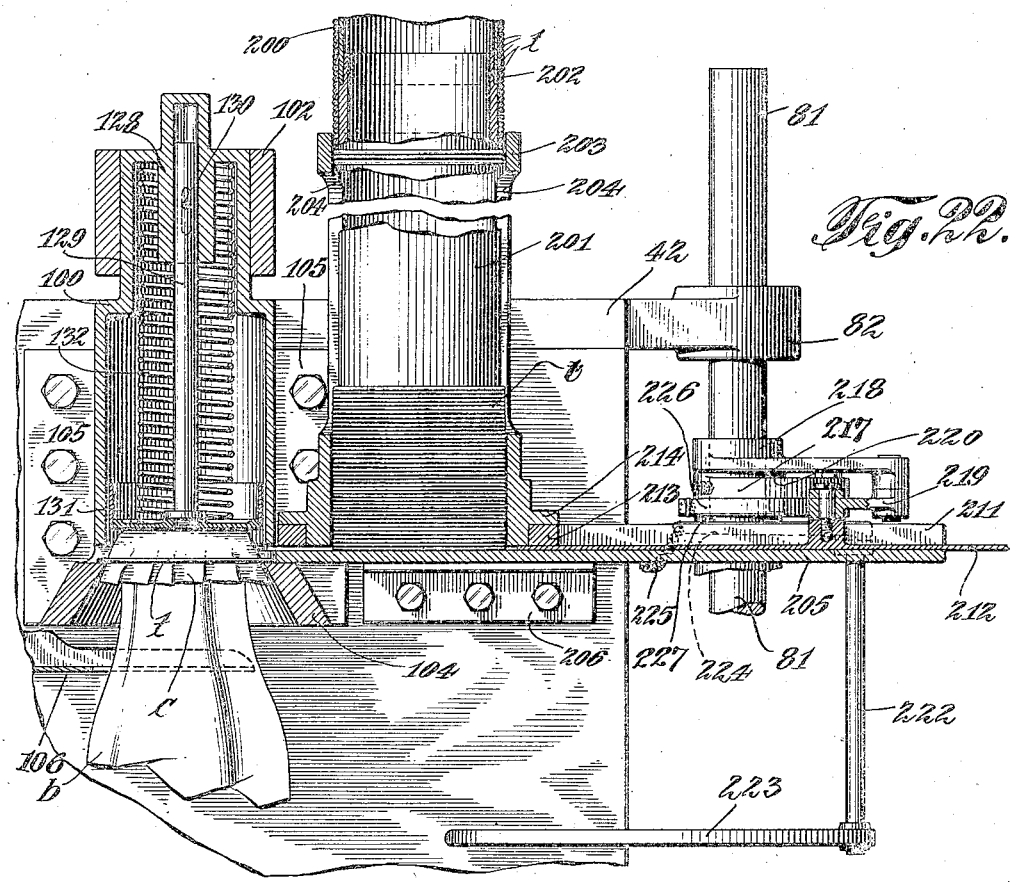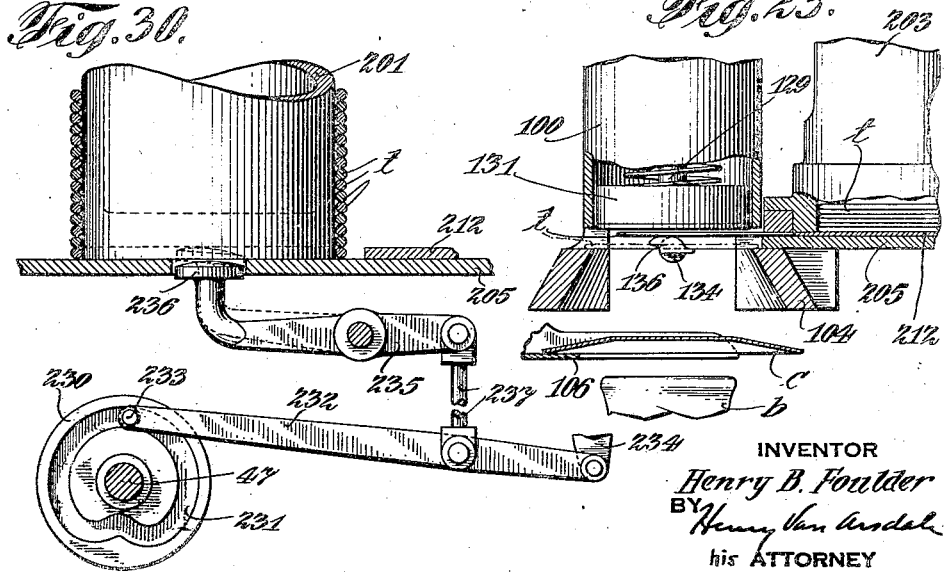

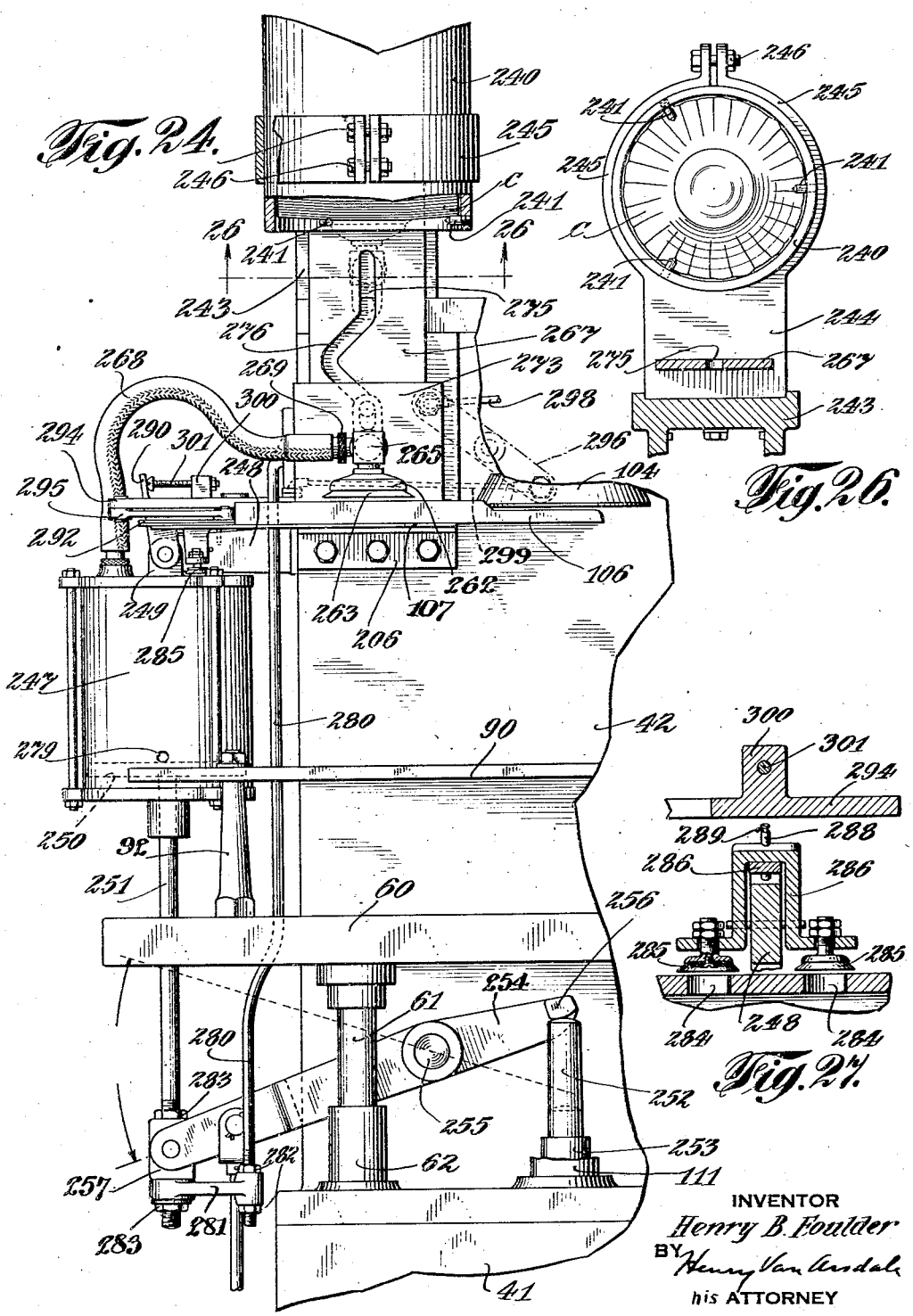

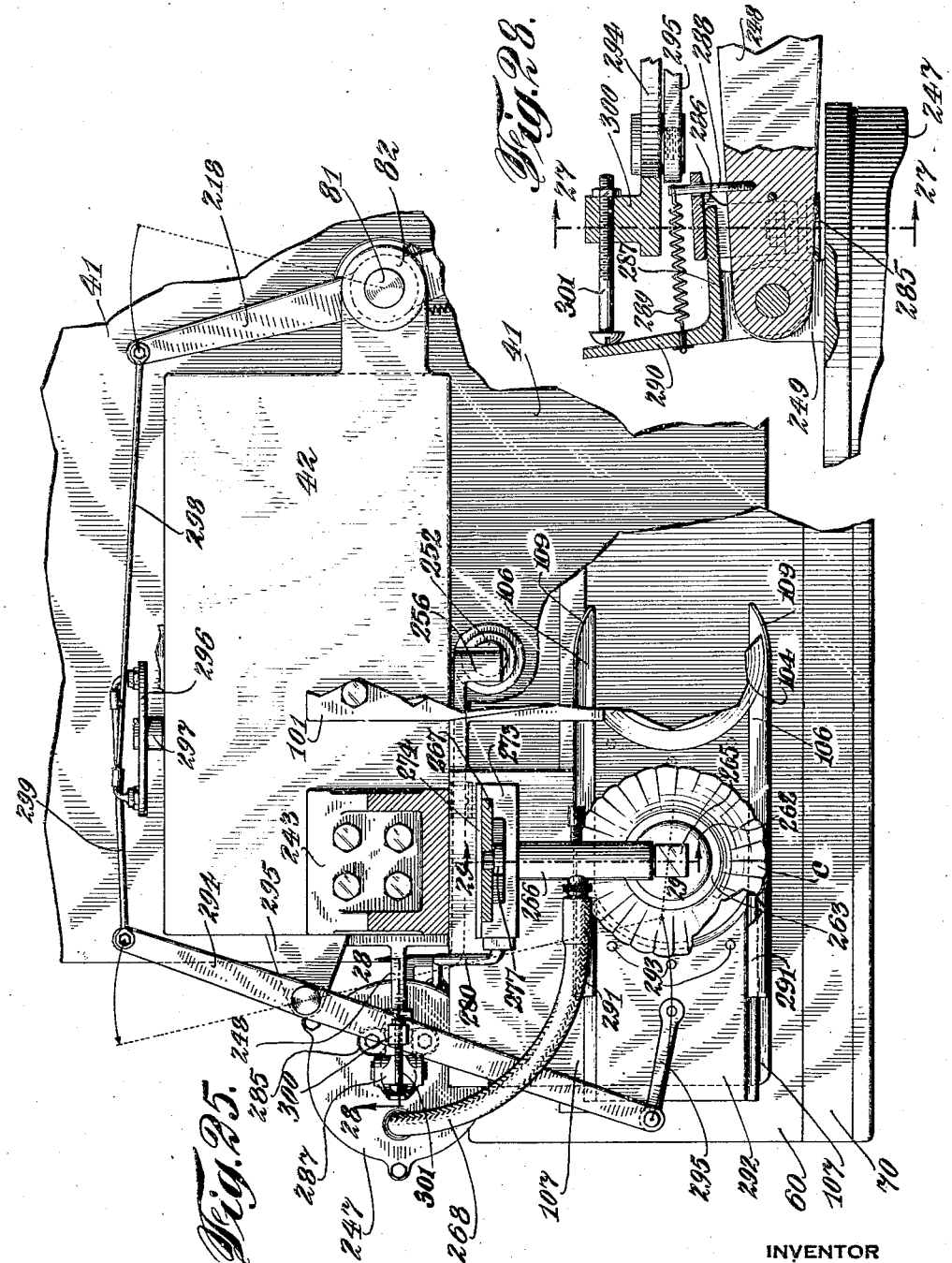

June 9, 1931. H. B. FOULDER 1,809,587
BOTTLE CAPPING AND SEALING MACHINE
Filed April 16, 1929   11 Sheets-Sheet 11
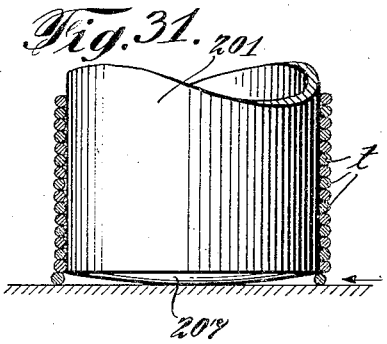
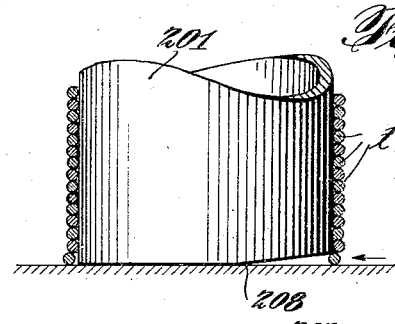
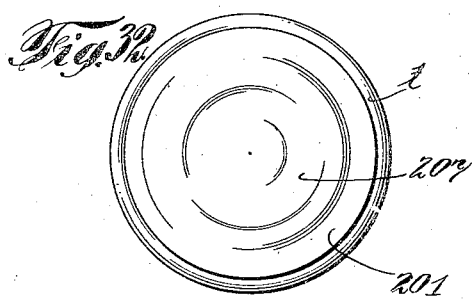
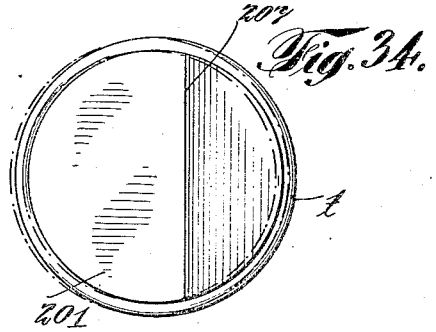
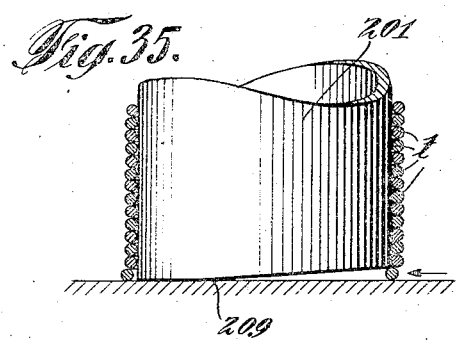
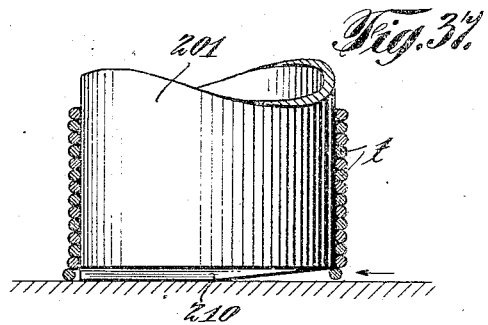
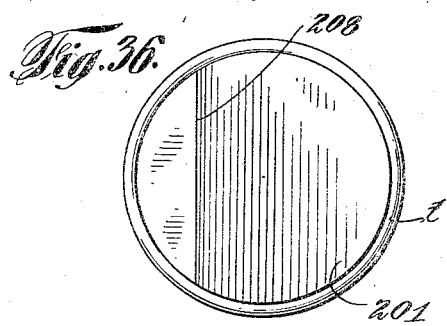
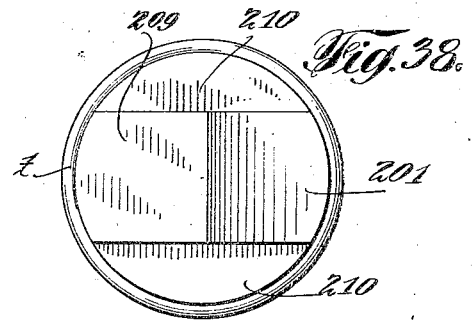
INVENTOR
Henry B. Foulder
BY
his ATTORNEY Patented June 9, 1931

1,809,587

UNITED STATES PATENT OFFICE

HENRY B. FOULDER, OF GLENBROOK, CONNECTICUT, ASSIGNOR OF ONE-HALF TO JOHN P. CURRY, OF RIVERSIDE, CONNECTICUT

BOTTLE CAPPING AND SEALING MACHINE

Application filed April 16, 1929. Serial No. 355,597.

This invention relates to machines for securing caps or the like on bottles, or other articles, and also relates to mechanism for applying the caps to the bottles or other articles.

The machine, which is chosen for description and is illustrated herein to show one possible embodiment of the invention, is a machine adapted to apply hood caps over the mouths of milk bottles, and to secure the hoods in place by means of wire.

In an application filed by me March 18, 1926, Serial No. 95,584, entitled method of sealing articles with wire and apparatus therefor, I have disclosed a machine adapted to secure hood caps over the mouths of milk bottles, or other articles, by means of wire ring ties which are twisted by the machine to bind the skirt of the cap against the article, each tie being nicked by the machine in the vicinity of the twisted portion so that the tie will break and release the hood when subsequent twisting of the tie is attempted. The advantage of a tie of this type is that any authorized person by turning the twisted portion may readily and easily break the tie to obtain access to the contents of the article. A further advantage is that the seal is apt to be broken when an attempt is made by an unauthorized person to obtain access to the contents of the article and cannot be replaced, and the absence of the tie will give notice that the seal has been tampered with. A further advantage is that the ties are removed by the consumer and do not have to be removed by the bottler from emptied bottles or other containers to prepare the bottles or articles for refilling. This not only saves cost of labor and time, but also eliminates danger of breakage attending the removal of the ties.

One of the principal objects of this invention is to improve over the machine described and claimed in my said prior application, and to render the mechanism whereby the ties are applied, twisted and nicked more efficient, durable and simplified.

A further object of this invention is to provide a machine which not only twists and nicks ties about articles to be sealed, but also automatically applies a hood cap to each article, and positions and shapes each hood cap properly to be tied.

A further object of this invention is to provide in a capping machine improved mechanism for applying wire ring ties to the articles to be tied in proper position for being twisted thereabout.

A further object of this invention is to provide a capping machine adapted to operate on bottles, or other articles, having improved mechanism for placing articles in proper position to be capped and tied.

A further object of this invention is to provide a capping machine, which is adjustable to operate on articles of various sizes, and to provide mechanisms for this purpose which may be adjusted easily and simply, and which is simple in construction and efficient in operation.

A further object of this invention is to provide improved mechanisms for feeding wire ring ties, which is adapted to be controlled by the presence or absence of an article moving toward the place where it is to be tied, and to provide ring feed mechanism which is of simple and durable construction, and is positive in operation.

Another object of this invention is to provide a ring feed mechanism of the character described, which is adapted to engage each wire ring tie with the article to be tied thereby, and also with the tie twisting means of the machine.

Another object of this invention is to provide a machine to advance articles to be tied successively to tying position; to apply and properly shape a hood cap on each article to be tied; to place a wire ring tie about the skirt of each applied hood cap; to twist the tie to tighten it against the skirt of the hood cap whereby the cap is fastened to the article; to nick each tie adjacent the twisted portion; and to automatically withdraw the article from the machine.

Other objects of this invention will be in part obvious and in part pointed out hereinafter.

In accordance with this invention the machine is provided with means for progressing articles to be tied intermittently and successively to tying position, and then to withdraw each article from tying position to permit the placement of the succeeding article in tying position. There is a magazine adapted to hold a quantity of wire ring ties, and means are associated with this magazine adapted to be actuated by passing articles to be tied whereby a ring is fed to a suitable open support and in engagement with a twisted spindle. A magazine containing a plurality of hood caps in somewhat extended shape is provided. Mechanism is provided for automatically applying one of these caps to each bottle as it approaches tying position. The bottle with the cap applied is adapted to move endwise through an annular form member, which gathers the skirt of the hood cap about the bottle neck. Just over this form member is the open support carrying the ring with which the hood is to be tied on the bottle, so that as the bottle penetrates the form member its top will penetrate the supported ring tie. Movement of the bottle ceases when the tie encircles the skirt of the hood cap. Twisting mechanism is provided which thereupon twists the tie to bind the hood cap over the mouth of the bottle, and nicking mechanism is provided which operates thereafter to place a nick in the tie adjacent the twisted portion. Means are provided to withdraw the bottle from tying position when the tying and nicking operations have been completed. A source of power for driving the machine is provided, and all the mechanisms are connected to each other and to this single source of power so as to operate in predetermined relationship and sequence.

Preferably the article positioning means are adjustable so as to be adapted on proper adjustment to place bottles, or other articles, of different sizes in proper position to have the hood caps applied thereto and to be tied.

With these and other objects in view the invention consists in the features of construction, combinations of elements and arrangements of parts hereinafter described, illustrated in the accompanying drawings, the scope of the application being particularly pointed out in the appended claims, it being understood that various changes from the form, combinations and construction may be made without departing from the spirit of the invention and claims.

In order that a clearer understanding of this invention may be had, attention is hereby directed to the accompanying drawings forming a part of this specification, and illustrating certain possible embodiments of this invention, and in which:—

Fig. 2 is a side view of the same;

Fig. 3 is a top view thereof;

Fig. 4 is a rear view of a section thereof;

Fig. 5 is a sectional view showing the main drive shaft and operating cam and gear organization;

Figure 1:
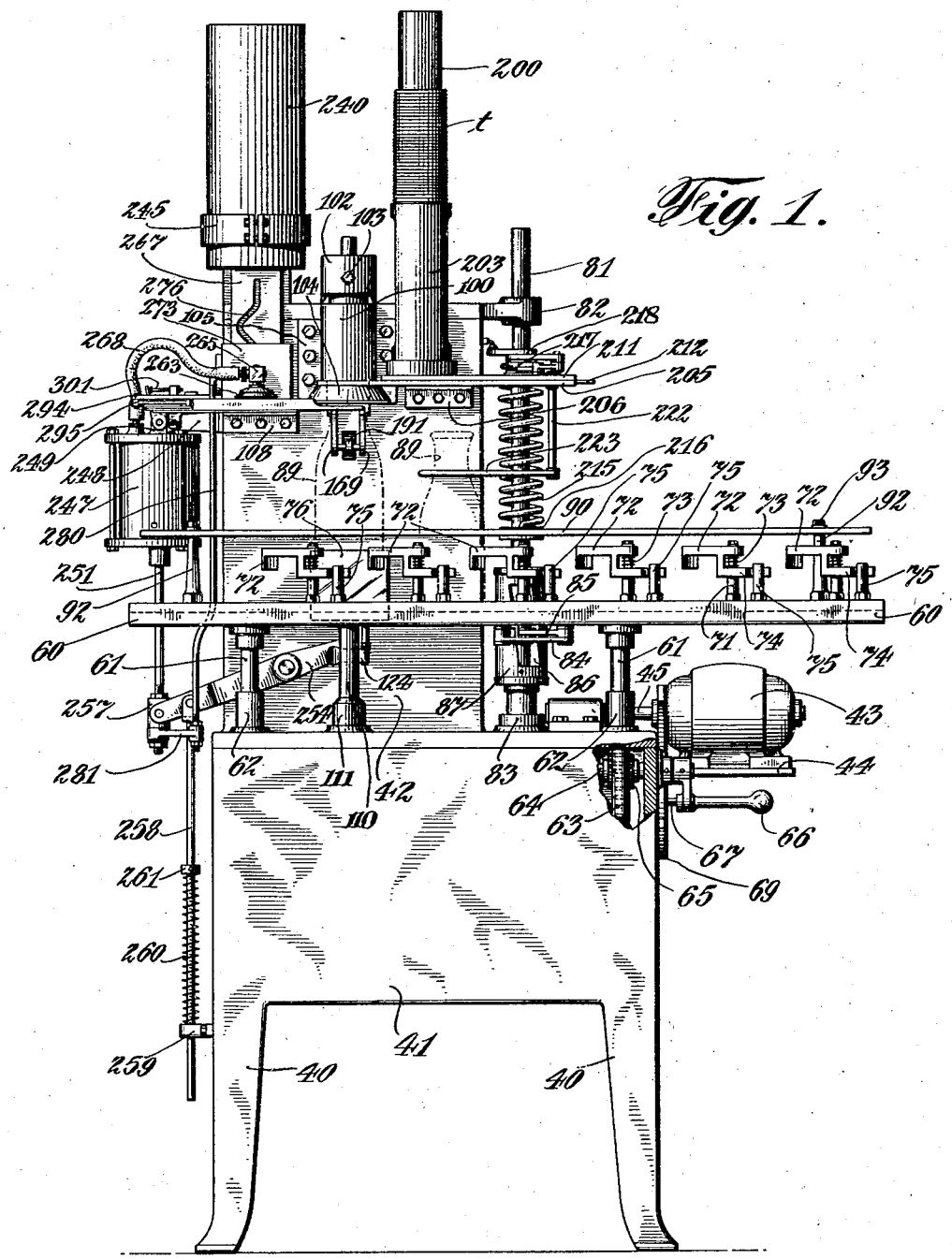
Fig. 1 is a front view of a machine embodying my invention.

Figs. 6, 7, 8, 9, 10, and 11 are sectional views taken respectively on the lines 6—6, 7—7, 8—8, 9—9, 10—10, and 11—11 of Fig. 5;

Fig. 12 is a sectional view showing a detail of the bottle raising and lowering mechanism, and is taken on the line 12—12 of Fig. 10;

Fig. 13 is a sectional view of a detail of the same, and is taken on the line 13—13 of Fig. 10;

Fig. 14 is a top view of the central portion of the machine with the cover plate removed, certain parts being omitted and others broken away to simplify the showing;

Fig. 15 is a sectional view taken on the line 15—15 of Fig. 14;

Figs. 16, 17, and 18 are sectional views of a portion of the tying mechanism in different positions of operation;

Figs. 19, 20, and 21 are respectively bottom, side and front views of the tie engaging end of the twisting spindle;

Fig. 22 is an enlarged sectional view of a fragment of the machine, and is taken on the line 22—22 of Fig. 14;

Fig. 23 is an enlarged sectional view of a fragment of the machine adjacent the point where the bottle is tied, and showing a fragment of the top of a bottle and a hood cap ready to be raised into position to be tied;

Fig. 24 is an enlarged elevation of the hood cap feeding mechanism of the machine;

Fig. 25 is a top view of this portion of the machine, certain portions being broken away for the sake of clarity;

Fig. 26 is a sectional view taken on the line 26—26 of Fig. 24;

Fig. 27 is a sectional view taken on the line 27—27 of Fig. 28;

Fig. 28 is an enlarged sectional view of a detail of the construction, and is taken on the line 28—28 of Fig. 25;

Fig. 29 (Sheet 2) is a sectional view of another detail of the hood cap feeding mechanism, and is taken on the line 29—29 of Fig. 25;

Fig. 30 is an enlarged view of a modification of a detail of the ring feed mechanism;

Figs. 31, 33, 35, and 37 are enlarged sectional views of fragments of the lower ends of the internal guide sleeve of the ring feed magazine, each illustrating a different possible shape of the lower surface of this member; and Figs. 32, 34, 36, and 38 are respectively elevational views of the bottom surfaces of the sleeves shown in Figs. 31, 33, 35, and 37.

Similar reference characters refer to similar parts throughout the several views of the drawings.

Referring to the drawings, the entire mechanism of the machine, including the driving motor, is supported on and in a suitable table or support comprising legs 40, a box portion 41 in which the main drive shaft and operating cams are supported in a bath of oil, and a box portion 42 which encloses certain other portions of the mechanism. It is to be understood, however, that other means of supporting various parts of the machine may be provided without departing from the scope of this invention, although it will be noted that with this arrangement of the mechanism, my machine may be assembled into a small organization, which is deemed to be an advantage.

Figure 6:
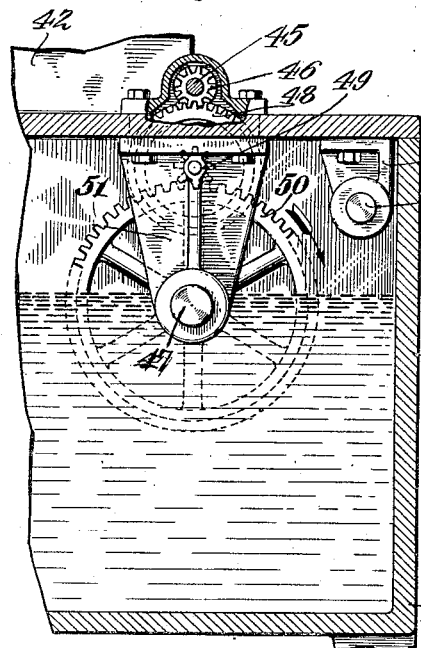
Figure 7:
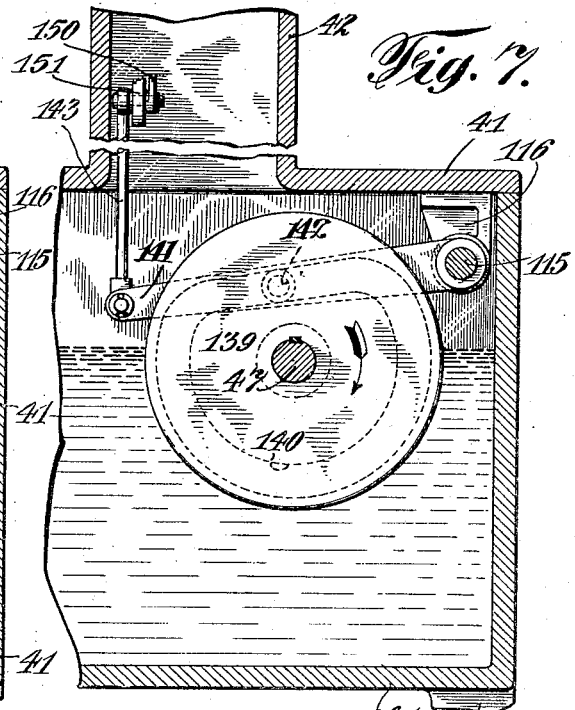
Figure 8:
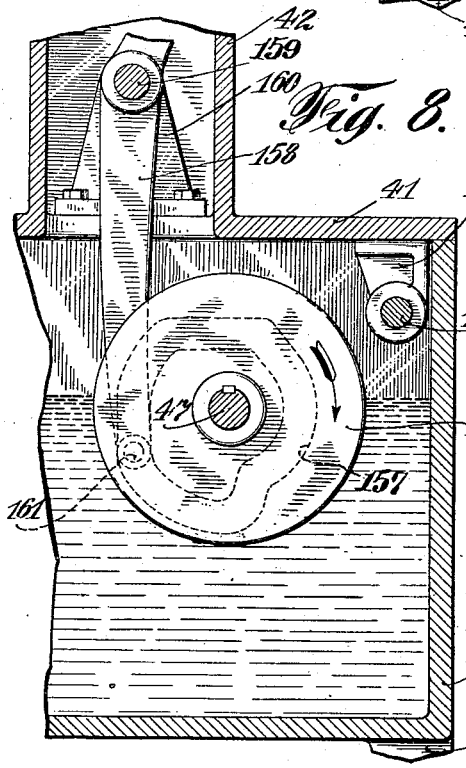

I have illustrated as an example of my invention, a machine driven by a motor 43, supported on a shelf 44 secured to the table 41. As shown in Figure 6, the motor shaft 45 carries a pinion 46 operatively connected to the main drive shaft 47 of the machine through a train of reduction gears 48, 49 and 50. Gear 50 is secured to one end of the drive shaft 47, as shown in Fig. 5 of the drawings. Shaft 47 is journaled in suitable brackets 51, which are hung from the top of box 41. Obviously, the motor is customarily provided with the usual switch whereby the power may be turned on or off.

Bottle advancing means

The bottles are advanced along a shelf 60 extending horizontally along one side of the machine. The shelf is supported on a pair of upright posts 61 slidable through fittings 62 mounted on the cover of the box portion 41. The lower ends of posts 61 are furnished with rack portions 63. A horizontal shaft 64 journaled in the sides of box portion 41, carries a pair of pinions 65, each adapted to engage the rack portion of one of the posts. By means of a crank arm 66 secured to one end of the shaft 64, the shelf 60 can be raised and lowered at will to accommodate bottles of various heights. The crank arm 66 may be provided with a spring-pressed pin 67 adapted to removably engage in suitable holes 68 in a holding plate 69, mounted on the box portion 41. By manipulating the crank arm 66 and inserting pin 67 in the proper hole in plate 69, the shelf can be moved to and retained in any desired raised position.

Shelf 60 is provided with a longitudinal groove, preferably dove-tailed, in which is slidably positioned a bar 70. Bar 70 is preferably provided with beveled edges corresponding with the inclination of the sides of the slot. A plurality of post members 71 are secured to the bar 70 in uniform spaced relationship. A bottle advancing finger 72 is rotatably mounted on each post 71. These fingers are adapted to engage behind bottles on the shelf 60, and to shove the bottles therealong when the bar 70 is reciprocated in one direction. When the bar 70 is moved in the reverse direction, each finger 72 pivots on its post 71, slides across the side of the next bottle and finally snaps into position behind the same, due to the action of a spring 73, which encircles each post 71 and has one end secured to the post and the other end to the finger. Each finger is provided with a tail portion 74, which is adapted to abut a pin 75 carried on the bar 70, so as to prevent the fingers 72 from being swung too far inwardly of the bar.

Means are provided for reciprocating the bar 70 to advance bottles engaged by the fingers 72 successively along the shelf 60. Each bottle is thus advanced to and upon a platform 76, which reciprocates vertically through an opening provided in the shelf 60 as shown in Fig. 10. Platform 76 raises each bottle into position for tying. The construction and operation of the bottle raising mechanism will be described hereinafter.

The bar 70 is reciprocated by means of a drum 77 which is secured to the main drive shaft 47 for rotation therewith. Drum 77 is provided with a cam track 78 in which rides a roller or pin 79 secured to one end of a lever 80. The other end of lever 80 is secured to a vertical shaft 81 which extends from inside the box 41 upwardly adjacent the shelf support. The upper end of the shaft may be journaled in a suitable bracket 82 projecting from the box portion 42 and the lower end thereof journaled in a suitable fitting 83 provided in the cover of the box portion 41.

One end of a pair of connected links 84 and 85 is journaled to a pin projecting from the slide bar, and the other end slidably encircles the shaft 81. Link 85 projects through a vertically extending slot 86 cut in the side wall of a drum member 87 secured to and rotating with shaft 81. It will be seen that as the drum member 87 rotates back and forth through a predetermined angle the edges of the slot engage the sides of link 85 to likewise rotate the same, and thus reciprocate the slide bar 70. The drum thus provides the operative connection between the link 85 and the shaft. The vertical slot arrangement permits the link 85 to slide along the shaft as the shelf is raised or lowered. A strap 88, secured to the under side of the shelf, may be provided to support the links 84 and 85 in proper position.

For purposes of illustration, I have shown diagrammatically a number of milk bottles (b) positioned on the shelf and in the process of being moved therealong by the finger elements 72. In order that the machine operate successfully, it is necessary that each article or bottle to be tied be moved squarely upon the vertically reciprocable platform 76 and in such a position as to be properly placed for the tying operation. When articles of different cross-sectional area are to be moved, such as quart, pint and half pint milk bottles, it is evident that some adjustment of the article-moving fingers in reference to the raising platform must be made. For example, where articles of smaller diameter are to be tied, it is necessary that the finger moving the article from the shelf and onto the platform be correspondingly advanced and each succeeding finger advanced relatively to the first. This is accomplished by shifting the slide-bar, on which the fingers are mounted, forwardly the desired amount.

Bottles for a particular purpose (milk bottles, for example), in decreasing from one volume size to another, generally decrease in height as well as in diameter. In other words, a change in diameter generally follows a change in height where a series of the same type of container is used, each of graded volume. In order that the slide-bar adjustment and the vertical adjustment of the shelf may be made simultaneously and by a single manipulation of the operator the vertical slot 86 in the drum 87 is cut at an angle to the vertical, as shown more particularly in Figs. 1 and 2. By means of this device, the slide-bar is simultaneously and automatically shifted the desired amount with each raising or lowering operation of the shelf. If all the articles to be tied are of the same cross-sectional diameter, it is understood that the slot would simply extend vertically without inclination or deviation. In any event, it is understood that the slot can be so formed as to effectuate the proper shifting of the slide-bar to accommodate articles of various cross-sectional diameter.

Shelf 60 is provided with a guide member 90 along which the bottles move, shown more clearly in Figs. 1 and 3. This guide bar is provided with a pair of slotted lugs 91, each of which rests upon an upright post 92 secured to the shelf member. A screw bolt 93 extends through each lug slot and screws into the top of the post, adjustably securing the guide bar in position. By manipulating the screw bolts the guide bar may be adjusted laterally in reference to the shelf and the article advancing fingers to accommodate the articles being moved therealong.

*Article tying means*

The article tying means comprises a cylindrical casing 100 open at its lower end and closed at its upper end. Casing 100 is supported from the box portion 42 by a bracket having a laterally extending arm portion 101 carrying a ring portion 102 in the outer end thereof. The cylindrical casing extends through ring portion 102 and may be adjustably secured in position by a set screw 103. A truncated cone-shaped cap forming member 104 is positioned at the lower open end of the casing and is mounted directly over the vertically reciprocable platform 76. The cap forming member may be provided with a pair of bracket portions 105 cast integrally therewith which support the same from the side wall of box portion 42.

The top of the truncated cone shaped cap-forming member presents a smooth flat surface of such size as to conveniently support a ring tie (t). Referring more particularly to Figs. 16, 17, 18 and 22 it will be noted that the top of the cap-forming member is also spaced somewhat from the lower open end of the casing 100. Means are provided for feeding successive rings into position on the cone member, to be described hereinafter.

A rack for the closure caps (C) is provided and extends horizontally beneath the cap-forming member. This rack comprises essentially a pair of horizontally extending guide members 106 adapted to support a closure cap therebetween. These guide members rest upon a horizontal plate member 107 supported from the box portion 42 by means of a suitable bracket 108. One end of each guide member overhangs the plate member and extends under the cap-forming cone 104. The overhanging ends of the guide members are provided with inturned side wall portions 109, shown more clearly in Fig. 25, which prevent the cap being advanced from being moved off from the end of the rack. Means are provided for feeding the closure caps to the supporting rack and for advancing them successively along the rack and into position beneath the cap-forming member. This cap feeding and advancing means will be described hereinafter.

When a cap has been positioned under the cap-forming member, as shown in Figure 16, the top of the bottle is projected up against the cap by the raising of the platform. In this upward movement, the sides or skirt portion of the cap is engaged by the cone-shaped inner periphery of the cap-forming member, which forces the skirt portion against the bottle. Continued upward movement of the bottle projects the end thereof through the ring tie positioned on the top surface of the cap-forming member.

The bottle-projecting platform 76 reciprocates through a round opening in the shelf. The platform is supported on the end of a hollow vertical shaft 110 and is normally positioned in the plane of the shelf, so that bottles can be readily moved thereon. The shaft slides through a suitable fitting 111 positioned in the cover of the box portion 41.

Mechanism is provided for reciprocating the shaft and platform at predetermined intervals. This mechanism comprises a cam member 112 fixed to the main drive-shaft 47. A rider arm 113 which carries a roller 114 at the mid-section thereof, rides on the surface of the cam, as shown more particularly in Figures 5, 10 and 12. One end of the rider arm is journaled to a horizontally extending shaft 115 carried by suitable brackets 116 fixed to the cover of the box portion 41. A resilient connection is provided between the end of the rider arm and the platform-supporting shaft. This connection comprises a collar member 117 fixed to the shaft and a second collar member 118 slidable on the shaft, with a coil-spring 119 encircling the shaft and disposed between the collars. The end of the rider arm is preferably forked, each fork being connected to the slidable collar member 118 by a link element 120. A spacer plate 121, secured at one end to the fixed collar 117, is provided with a longitudinal slot 122 at the other end thereof, through which a screw secured to the slidable collar member 118 extends. This spacer plate holds the collar and coil spring assembly together and limits the maximum separating distance between the two collar members. It is seen that by means of this resilient connection the breaking of bottles due to any possible dislocation of the bottles on the platform with reference to the cap-forming cone is avoided. If the end of the bottle does not shoot directly into the cap-forming cone 104 but strikes the rim thereof and is thus prevented from entering the same, this resilient connection will permit the rider arm to move over the cam without a further raising of the shaft.

Means are provided which permit any necessary adjustment of the platform 76 in relation to the cap-forming member, to accommodate the article about to be sealed. The raising platform is secured directly to the end of a post member 123 which telescopes within the hollow shaft 110. A series of notches may be provided along one side of the post member as shown more particularly in Figure 10, with which a finger-operated locking lug 124 may selectively engage. The locking lug may be journaled at one end to a pin 125 suspended from a block 126 carried by the hollow shaft. A coil spring 127 operates to normally retain the locking lug in notch engaging position. By manipulating the locking lug 124 it is seen that the platform can be raised and retained at any desired elevation. The platform may be thus adjusted so that the top of the same remains flush with the top of the shelf 60 at all times when in bottle-receiving position.

The upper closed end of the casing 100 is provided with a hub portion 128 into which the end of a vertically extending rod 129 is adapted to slide. A pin 130 projecting inwardly from the hub portion and extending into a slot cut in the rod may be provided to prevent the rod from rotating in the hub portion, and also to limit its sliding movement therein. The lower end of the rod may be provided with a disk 131 adapted to telescope within the casing. A coil-spring 132 encircling the rod member is positioned between the closed top portion of the casing and the disk element, as shown in Fig. 16. When the bottle is raised, the open end thereof picks a cap member off from the rack, moves it through the cap-forming cone 104 and into engagement with the disk element 131 on the end of the rod. The platform moves the bottle up into such a position as to compress the coil-spring 132 slightly, thus causing the disk element to rest on top of the bottle with a predetermined pressure. When the end of the bottle has been projected through the ring tie positioned on the top surface of the cone, the twisting mechanism comes into play to bind the tie about the skirt of the cap, sealing the cap member to the bottle.

When the ring tie is moved into position, (see Fig. 23) a side portion of the tie passes over a twisting head secured by means of a screw 133 to the end of a twisting spindle 134. The twisting head is shown in some detail in Figs. 19, 20 and 21 and may comprise a base portion 135 at the outer edge of which is a vertical portion 136 which is offset to one side of the axis of rotation of the spindle. On one side the bottom of vertical portion projects to form a shoulder 137 and on the other side the top portion thereof also projects to form a shoulder 138. The head is so constructed that when the spindle rotates in the direction of the arrow shown in Fig. 21, it will engage a tie on its shoulders 137 and 138 and cause the tie to be twisted. When the spindle is rotated in the reverse direction, the twisting head will rotate itself out of engagement with the tie by reason of the offset disposition of the head with respect to the axis of the spindle and the absence of portions of the rod which would engage the tie during this motion.

The rotation of the spindle, first in one direction and then in the other, is accomplished by means of a cam and rider arm arrangement. Referring more particularly to Figs. 5, 7, 14 and 15, a disk member 139 having a cam groove 140 cut therein is keyed to the main drive-shaft 47. The rider arm 141 carries a roller 142 which projects into the cam groove and rolls along therein. The rider arm is journaled at one end to the shaft 115 and at its other end is connected to a vertically extending rod 143.

The twisting spindle 134 extends through a pinion 144 journaled in a side wall of the box portion 42 as shown more particularly in Fig. 16. The spindle is provided with a number of longitudinally extending grooves 145 adapted to be engaged by suitable lugs within the bore of the pinion. By this arrangement it is seen that the spindle may reciprocate freely through the pinion and yet be positively rotated upon any rotative movement of the pinion. The pinion meshes with a gear segment 146 fixed to a shaft 147 projecting through the rear side of the box portion. Since vertical rod 143 reciprocates a fixed distance it is seen that if this rod were fixedly secured to the gear segment 146, pinion 144 would be given a correspondingly fixed number of revolutions, twisting the wire tie a fixed number of times. I have accordingly provided an adjustable connection between the rod 143 and the gear segment by means of which the number of twists placed in the wire may be varied as circumstances require.

Shaft 147 is journaled within a hollow shaft 148 which also projects through the rear side wall of the box portion. The inner end of the hollow shaft is provided with a laterally projecting arm 149. The outer end of this arm is connected to the vertically extending rod 143 by means of a link element 150. The gear segment is provided with a slotted lug 151 projecting from one of the spokes thereof, as clearly shown in Fig. 15. A pin 152 connecting link 150 to the vertical drive rod 143 is adapted to extend through the slot of this lug. A plate member 153 is secured to the outer end of the hollow shaft 148 and a crank-arm 154 secured to the outer end of the shaft 147. A spring pressed pin 155 carried by the crank-arm 154 is adapted to engage in suitable holes in the plate member 153 to adjustably fix one in relation to the other.

Now it is seen that by adjusting crank arm 154 relative to the plate 153, pin 152 carried by the drive rod 143 can be variously positioned along the slotted lug to vary the rotative radius of the gear segment. The pinion and twisting spindle 134 will be given a correspondingly greater or lesser number of twisting revolutions. Thus, by a simple relative adjustment of the crank arm and plate the number of twists given the wire tie can be varied at will as circumstances require. This is of considerable importance, since an excessive number of twisting revolutions of the twisting head is liable to break the tie, or on the other hand, a deficient number of twisting revolutions will leave the tie loose upon the bottle.

Before twisting of the wire tie can commence, it is necessary that the wire tie be pulled taut around the bottle, as shown more particularly in Fig. 17. This can be effectuated by retracting the twisting spindle the proper amount. Likewise, during the twisting operation it is necessary that the spindle be permitted to advance slowly in response to the contraction of the wire.

The mechanism for retracting and advancing the spindle at the proper interval is shown more particularly in Figs. 5, 8, 14, 15 and 16. A disk member 156 having cam groove 157 therein is fixed to rotate with the drive-shaft 47. A vertically extending rocker-arm 158 is journaled at its mid-section to a suitable shaft 159 journaled at each end thereof to a pair of brackets 160 within the box portion 42. The lower end of the rocker-arm is provided with a roller 161 which extends into the cam groove 157 and rolls along therein. The upper end of the rocker-arm is provided with an open slot 163 which saddles a pin 164 extending laterally from a collar member 165 secured to the twisting spindle. Now, it is seen that reciprocation of the rocker-arm 158 operates to move the spindle back and forth through the pinion 144. The cam groove is so shaped that the wire tie is pulled taut prior to the twisting operation and the spindle permitted to advance gradually towards the ring tie as the twisting operation progresses. It is understood that as the twisting of the tie progresses it is necessary that the twisting head be permitted to move toward the tie so as to keep a uniform tensile strain on the wire. If this advance movement were not provided for, there would be a decided tendency for the wire to break at the twist.

When the twisting operation has been completed, nicking means come into play to place a nick in the tie adjacent the twisted portion. To this end, I provide an anvil member comprising essentially a pair of side arms 166 and a bridge or anvil portion 167. The anvil member is suspended in pivotal position by a pin 168, which passes through the side arms 166 and is journaled in the bracket portions 105 shown more clearly in Fig. 14. When a nicking operation is to be performed, the anvil member is rotated about the pivot so as to bring the anvil portion 167 against the under side of the work, as shown in Fig. 18.

The nicking hammer is somewhat similarly constructed and comprises the side arms 169 and a bridge portion 170 connecting them. The outer edge of the bridge portion is provided with a small sharp nicking point 171, which cuts the nick indentation in the wire tie. The nicking hammer is pivoted on a pin 172 passing through the mid-section of the side arms 169. Pin 172 is journaled in the lower ends of the anvil side arms 166.

Means are provided for swinging the anvil member into operative position at the proper interval. One of the side arms 166 is provided with a shoulder portion 173. An abutment plate 174 is provided with a recess 175 at the inner lower edge thereof, which is adapted to accommodate the shoulder portion 173 when the anvil is in normal at rest position. The outer corner of the abutment plate and the shoulder portion of the side member are beveled slightly. Pressure exerted on the shoulder portion 173 by the downward movement of the abutment plate will swing the bridge portion 167 of the anvil member up against the underside of the wire. Downward movement of the abutment plate 174 is continued to a point where the same is positioned to abut against the rear edge of the side arm 166 as shown in Fig. 18 thus retaining the anvil member firmly in raised position.

Mechanism is provided for lowering and raising the abutment plate into and out of abutting position. A disk member 176 having a cam groove 177 therein, as shown in Figs. 5 and 11, is keyed to the main driveshaft 47. A crank-arm 178 pivoted at its mid point to a pin 179 extending from the supporting bracket 51, carries a roller 180 at one end thereof adapted to roll within the cam groove. A rod member 181 connected to the other end of the crank-arm 178 extends upwardly into the box portion 42. Rotation of the disk member causes vertical reciprocation of the rod. A bracket member 182 secured to the side wall of the box portion 42 may be provided to guide the rod in its reciprocating movement. The upper end of the rod member is bent into convenient form so as to pass through a slotted aperture 183 in the side wall of the box portion, as shown in Figs. 14 and 15. The upper end of the rod is secured directly to the abutment plate 174, to reciprocate along with the rod. A coil spring 184 secured to the pivot pin 172 and the box portion 42 (shown in Fig. 14) may be provided to normally retain the anvil member in inoperative position.

Figure 9:
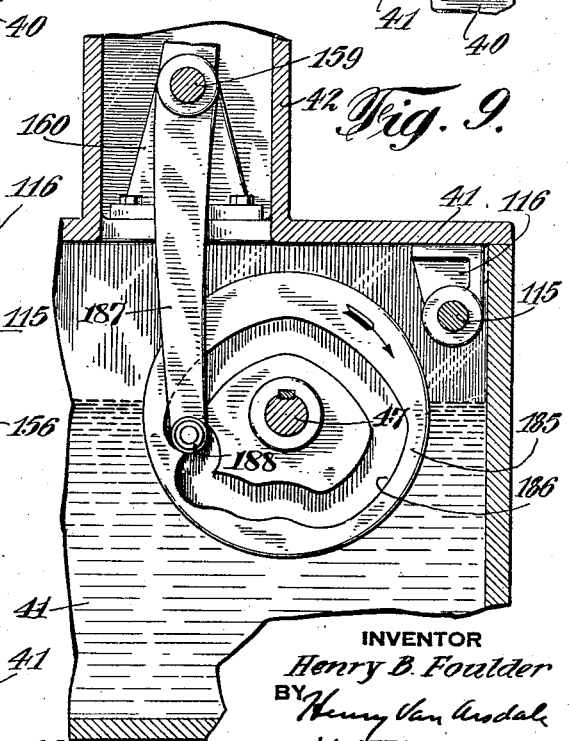

The nicking hammer actuating mechanism preferably consists of a disk member 185 shown in Figs. 5 and 9 keyed to the main drive-shaft 47. The disk member is provided with a cam groove 186 of a shape such as shown in Fig. 9. A rocker arm 187 is journaled at its mid-section on the shaft 159 and extends upwardly into the box portion 42. The lower end of this rocker arm is provided with a roller 188 which runs in the cam groove 186 of the disk member. A U-shaped saddle member 189 is pivotally connected to the upper end of the rocker arm by a pin 190 as shown in Fig. 16. A link member 191 connects the U-shaped member to the lower end of the side arms 169 of the nicking hammer. A pair of set-screws 192 pass through the U-shaped member 190 and are adapted to seat against the upper end of the rocker-arm 187. By manipulating these two screws 192 it is seen that the nicking point of the nicking hammer can be finely adjusted in its relation to the wire tie so that the depth of the nick detent made in the wire can be accurately determined. An opening 193 (shown in Fig. 4) may be provided in the side of box portion 42 through which a suitable tool can be inserted to manipulate the set screws 192, thus permitting this adjustment to be readily made from the exterior of the machine.

It will be understood that the shape of the cam grooves in each of the operating disks 139, 156, 176 and 187 and their rotative relationship are such as to operate the twisting head, the abutment plate and the nicking hammer in the proper sequence. The capacity of this machine has been determined by test to be approximately sixty sealing operations per minute. This remarkably high production speed has been attained largely by the effective arrangement of the operating devices above disclosed, each device being sensitive and alertly responsive and all operating together in accurate and timely sequence.

*Ring-feeding means*

The tying element used in this machine is a circular wire ring ($t$). These rings may be threaded upon a hollow card-board tube 200 or other device prior to their placement on the machine. A cylindrical core 201, having a diameter slightly less than the diameter of the ring ties, is provided. The upper end of this cylindrical core is preferably grooved at 202 as shown in Fig. 22, over which the ring-carrying tube is adapted to telescope. The outer surface of the cylindrical core is smooth, so that the rings readily slide downwardly thereon in stacked relationship, as shown in Fig. 22. An outer casing or cage member 203 is preferably provided, which telescopes over the cylindrical core. The inside diameter of the cage member is slightly greater than the outside diameter of the wire rings. It is seen that sufficient space between the cylindrical core and the cage member is provided to permit the rings to pass therebetween, the cylindrical core and the cage member thus cooperating together to maintain the rings in stacked relationship. Apertures 204 may be cut in the side walls of the cage member, as shown in Fig. 16, so that the number of ring ties within the cage can be readily observed.

A plate 205 extends horizontally beneath the open end of the cage and rests at one end upon the top surface of the cone member 104. A bracket 206 may be provided to support the plate from the side wall of the box portion 42.

The lower end of the ring-carrying core 201 rests upon the plate 205 and is preferably beveled in some manner such as shown in Figs. 31 to 38 inclusive. As the lowermost ring drops down to rest on the plate 205, the lower end of the core is so beveled as to form a cam surface against which the ring may act when lateral force is applied thereto. The ring thus acts as a wedge to raise the core off from the plate and permit the ring to be removed from the same. The bevel may be formed in numerous ways as illustrated in the several views, Figures 31 to 38 inclusive.

Figures 31 and 32 show the core as terminating in a rounded end 207, the center of which rests upon the plate. The edges of the rounded portion are raised from the plate approximately the thickness of one ring, as shown in Fig. 31. To facilitate description, that part of the lower end of the core which contacts the plate will be hereafter termed the toe portion and that part raised off from the plate the heel portion.

Figures 33 and 34 illustrate the bevel as of simple wedge formation, the apex 208 of the wedge extending only a slight distance under the core, and the remaining portion of the core resting flatly on the supporting plate. Figures 35 and 36 show the bevel as of wedge formation, the apex 209 of the wedge extending beyond the central vertical axis of the core. Figures 37 and 38 show a beveled rib 210 formed on the lower end of the core. One end of the rib is canted off or beveled so as to permit the ring to cam under the rib and raise the core, permitting removal of the ring therefrom.

Either of the above forms is effective for the purpose of vending single rings in rapid succession. It will be understood that for successful operation the distance which the heel portion is raised from the plate is of prime consequence. This distance should closely approximate the cross-sectional diameter of the wire ring being fed. If this distance exceeds, to any extent, the ring cross-section, there will be a tendency for two rings to crowd under the end of the core and be fed out together or possibly jam the machine. If, on the other hand, this distance is much less than the cross-sectional diameter of the ring, it will be difficult to force the ring under the core. The beveled end should be accurately machined and smooth to facilitate the removal of the rings.

Means are provided for driving the successive rings under the ring core to remove the same therefrom. A pair of guide members 211 are longitudinally disposed along the plate 205. An ejector plate 212 of approximately the same thickness as the cross-sectional diameter of the rings is adapted to reciprocate between the guide members. The cage member 203 is held raised from the plate 205 a distance approximating the thickness of the ejector plate so as to permit the ejector plate to slide thereunder and remove the rings. A collar portion 213 cast integral with and extending between the guide members 211 may be provided on which a circumferential flange 214 formed on the cage member 203 is adapted to seat. Since the bottom of the cage member is spaced from the plate a distance closely approximating the cross sectional diameter of the tie, it is seen that such an arrangement would also generally prevent more than one tie being moved out at one time. It has been found that single rings can be vended by using the ring core 201 alone or the cage member 203 alone. More effective operation generally results, however, when both the core and cage member are used cooperatively.

The mechanism for reciprocating the ejector plate 205 is provided with a number of safety devices which render the ejector plate inactive if jamming of the rings should take place or if no article is positioned on the shelf 60 to be advanced into sealing position. A heavy coil spring 215 surrounds the vertical shaft 81 and is secured thereto at one end thereof by means of a collar member 216 fixed to the shaft. Referring more particularly to Figs. 1, 2, 14 and 22, the upper end of the coil spring is secured to a wing member 217 which idles upon the shaft. A lever member 218 is journaled on the shaft 81 at its midsection. One end of the lever member is connected to the ejector plate by means of a link 219. A pin 220 extends downwardly from the lever member 218 and projects into a slot 221 cut in the wing member fixed to the upper end of coil spring 215. A rod 222 journaled at one end to the horizontal plate 205 carries a feeler finger 223 at its free end. This feeler finger is adapted to be engaged by an article moved along shelf support 60 and about to be advanced upon the platform 76. A lever element 224 is fixed at one end to the upper end of the rod 222. A coil spring 225 fixed to the lever element 224 and the plate 205 normally operates to retain the feeler finger 223 swung over the shelf support. A second lever element 226 pivoted at one end to wing member 218 carries a downwardly extending pin 227 at the free end thereof. A notch is cut in the edge of this lever element 226 in which pin 220 carried by lever arm 218 is adapted to seat. A coil spring 228 secured to the free end of the lever element 226 and to the hub portion of the lever arm 218 operates to normally maintain the lever element 226 engaged against the pin 220 carried by the lever member 218.

Vertical shaft 81, reciprocating back and forth over a predetermined angle, heretofore described, causes the wing member 217 to similarly reciprocate. When the pin 220 is seated in the notch in lever element 226, it is seen that the lever member 218 swings back and forth along with the wing member, thus reciprocating the ejector plate 212. However, if no article is so positioned on the shelf 60 as to engage the feeler finger 223 and crowd it inwardly, coil spring 225 will operate to pull lever element 224 outwardly so as to engage pin 227 on the second lever element 226. Coil spring 225 is of considerably greater strength than coil spring 228. When the feeler finger 223 is not engaged by an article (b), coil spring 225 will operate to swing the lever element 224 outwardly, carrying the lever element 226 along therewith and out of engagement with the pin 220. The lever member 218 is thus operatively disconnected from the drive-shaft 81 and pin 225 then simply idles in the slot 221.

Coil spring 215 comes into play to prevent breakage of parts should jamming of the rings or ejector plate occur. The ejector plate will register any jamming difficulty by the increased force required to advance the same. The to-and-fro rotation of the drive shaft 81 is transmitted to the lever member 218 from the wing member 217 through the length of the coil spring 215. The coil spring possesses such stiffness as to cause the wing member 217 secured to its upper end to rotate with the drive-shaft under normal conditions. However, should jamming occur, the increased force required to advance the ejector plate will cause the coil spring 215 to twist and thus absorb this rotative motion of the drive shaft.

It is now seen that I have provided for all exigencies that may occur during the ejecting operation of the ring ties. No rings are ejected if articles are not being advanced into sealing position. Furthermore, continued operation of the machine will not result in breaking of the ejector parts should the ring ties become jammed along the path of advance.

The ejector plate wedges the ring ties successively between the end of the ring supporting core 201 and the horizontal plate, raising the core and permitting the ties to move off the end thereof. The ties are then advanced along the plate 205 until they drop into position on the top of the cap-shaping cone 104. A guide portion 229 projects from the end of plate 205 and partly encircles the top of the cone, as shown in Fig. 14, preventing the ring from being moved off from the top of the cone.

I have illustrated in Fig. 30 a modified form of ring feed construction. A disk member 230 having a cam groove 231 therein is fixed to the main drive shaft 47. A rider arm 232 having a roller 233 at one end adapted to move in the cam groove is pivotally secured at its other end to a suitable bracket 234 fixed to the box wall portion of the machine. A rocker arm 235 pivoted at its mid-section and having a head portion 236 is positioned underneath the ring core member 201. In this type of construction, the lower end of the core member is preferably flat. Successive rings can be removed from the core member only when the same has been raised the necessary amount. This raising operation is effectuated by the rocking movement of the rocker arm 235 which is operatively connected to the rider arm 232 by means of a connecting rod 237. As the disk member 230 rotates, the head portion 236 of the rocker arm raises the cylinder member the proper predetermined amount. The ejector plate 212 then comes into play in the usual manner to push the lowermost ring underneath the ring core and into article tying position. It is understood that the core member resting on the plate 205 is raised by the rocker arm off the plate member a distance approximating the thickness of one ring tie, as shown in dotted lines, Fig. 30.

*Hood cap feeding means*

The hood caps (*c*) used to seal the articles comprise waxed or oiled paper having a top portion and a plaited skirt portion. The hood caps are preferably inserted in a flat condition in a cap container 240, shown more clearly in Figs. 24 and 25. The cap container is open at the bottom, the hood caps resting on a plurality of studs 241 secured to the container and projecting inwardly. The hood caps are inserted in the container in inverted relationship, the top side of each hood cap being faced downwardly.

The cap container may be supported from box portion 42 by means of a suitable bracket. I have shown one form of bracket which may be used comprising a base portion 243 bolted to the top of the box portion, and a laterally extending frame portion 244 having a pair of band portions 245 adapted to encircle the container. A pair of bolts 246 may be used to connect the free ends of the band portions. By manipulating these bolts, the container can be properly clamped and held in the desired position.

Means are provided for removing hood caps successively from the container and placing the same on the hood cap rack. I preferably employ a pneumatic device for effecting this operation. An air cylinder 247 is supported in convenient position by a suitable bracket 248 secured at one end to the box portion 42 and at its other end to a lug 249 formed on the air cylinder.

A piston-head 250 fixed to the end of a piston rod 251 reciprocates within the air cylinder. Reciprocating motion is given to the piston head by means of a post member 252 which rests on the rider arm 113 which reciprocates the platform 76. Post member 252 slides up and down through a suitable fitting 253 provided in the cover of box portion 41. A rocker-arm 254 is journaled at its mid-section on a pin 253 projecting from the side wall of the box portion 42. The rocker-arm is provided with a laterally projecting lug portion 256 at one end thereof, which seats upon the end of the post member. The other end of the rocker-arm is connected to the piston rod by means of a connecting collar 257 adjustably fixed on the end of the piston rod 251. By means of this construction it is seen that at each reciprocation of the platform 76 the piston head 250 is given a corresponding reciprocation in the air cylinder. Post member 252 operates to draw the piston head downwardly.

Resilient means are provided for driving the piston head in the opposite direction.

This means comprises a rod 258 connected to the rocker arm 254 and slidable in a suitable bracket 259 connected to the framework of the machine. A coil spring 260 encircling the rod member is positioned between a collar 261 fixed to the rod and the bracket 259. The natural tendency of this coil spring to extend itself raises the piston head upwardly on the down movement of the post member and also operates to keep the lug portion 256 in constant contact with the top of the post.

The hood cap grasping device comprises a suction head, which is moved up under the hood cap container to grasp the lowermost hood cap and then moves down adjacent the cap rack to deposit the cap thereon. Referring more particularly to Figs. 24, 25 and 29, the head member comprises a base portion 262 having a disk shape rubber washer 263 secured thereto by means of a securing element 264 which screws into the base portion. The base portion is secured to the outer end of a pipe member 265 rotatively retained in a close fitting casing 266 extending from a guide-plate 267. The guide-plate 267 extends vertically and may be secured at its lower end to the supporting plate 107 and at its upper end to frame portion 244. A flexible hose 268 leads from the air cylinder 247 to a pipe fitting 269 projecting from the casing 266. A circumferential air groove 270, cut in the outer periphery of the pipe member, communicates with the air passage in the pipe fitting 269 and with the longitudinal air passage 271 in the pipe member. A vertical air passage 272 leads from the cup-shaped washer 263 to the longitudinal air passage 271. A continuous air passage is thus provided from the air cylinder to the suction head.

When the piston head moves downwardly a partial vacuum is created in the upper portion of the air cylinder. This partial vacuum is transmitted through the various air passages to the suction head. A flat surface disposed across the rim of the rubber washer may thus be suctionally held thereagainst.

Mechanism is provided to reciprocate the suction head from the hood cap grasping position to hood cap depositing position. The suction head is mounted on a base member 273 which is adapted to vertically slide along the guide-plate 267. The base member is slidably retained on the guide-plate by means of a brace 274 which extends in back of the guide plate and is secured to the base member. The guide-plate is provided with a slot comprising vertical end portions 275 and a V-shaped central portion 276, shown more clearly in Figure 24. The pipe member 265 is closed at its inner end and provided with a crank arm 277 carrying a lug portion 278 which is adapted to ride in the vertical slot cut in the guide member.

Now it is seen that when the base member 273 is moved upwardly along the guide plate, carrying the suction head with it, the pipe member and suction head secured thereto is given a 180° rotative turn as the lug element 278 of the crank-arm traverses the V-shaped section 276 of the slot. When the suction head is in the upper portion of the slot it is in a position to attract by suctional force the lowermost hood cap. In its downward movement the suction head is rotated through an 180° turn and comes to rest directly over the cap rack. The vacuum is then destroyed and the hood cap drops from the suction head to the cap rack.

A simple arrangement is provided for destroying the suction at the proper moment. The suction force exerted by the suction head on the hood cap is maintained during the downward travel of the head by the continued downward movement of the piston head. However, as soon as the piston head passes the air hole 279 a flood of air sweeps into the upper portion of the cylinder and destroys the vacuum therein. At this point the suction head has traveled the full length of the slot and has come to rest on the cap rack.

Means are provided for reciprocating the head carrying base member 273 along the guide plate at predetermined proper intervals. To this end I provide a vertically extending rod 280 connected to the base member 273 at its upper end. A connecting member 281 is secured at one end to the piston rod 251 and at its other end to the vertically extending rod 280. The base member and suction head are thus caused to reciprocate simultaneously with the reciprocations of the piston head.

In order to provide for any necessary vertical adjustment of the suction head I prefer to secure the rod member to the connecting member by means of a pair of adjusting nuts 282 which turn on threads provided at the end of the rod. By manipulating these nuts it is seen that the vertical position of the suction head can be finely adjusted. The lower end of the piston rod is similarly threaded to also receive a pair of adjusting nuts 283. This arrangement permits adjustment of the piston head in reference to the air cylinder and air hole.

A pair of air exhaust ports 284 are provided in the top of the air cylinder, as shown more particularly in Figure 27. During the up-stroke of the piston head, the air in the upper section of the air cylinder is exhausted through these ports. A pair of disk valves 285, each secured to one leg of a U-shaped bracket 286, are adapted to seat upon air-ports 284 to close the same during the down-stroke of the piston-head. The bridge portion of the U-shaped member seats on the foot portion 287 of an angle-iron lug which is pivotally connected to the upstanding lug 249 in the top of the air cylinder, shown more clearly in Figure 28. A pin 288 extends through a slot in the bridge portion of the U-shaped member 286 and is secured to the cylinder-supporting bracket 248. A coil-spring 289 extends between the pin 288 and the upstanding flange 290 of the angle-iron lug, normally drawing the lug forwardly and maintaining the valves 285 in air-port closing position. It is seen that by rocking the angle-iron lug member 286 on its pivot the disk valves can be moved into and out of port closing position. Means are provided for rocking the angle-iron lug member to raise and lower the valves at the proper intervals which will be presently described.

Means are provided for advancing each successive hood cap dropped on the cap rack by the suction head into article sealing position. Guide-bars 106 are each provided with a projecting flange 291, which slidably retains the cap-advancing plate 292 between the guide-bars. Cap-advancing plate 292 is provided with a plurality of upstanding pins 293, which together engage the edge of the hood-cap positioned on the cap-rack. As the cap-advancing plate is moved towards the right (Figure 25), the upstanding pins 293 engage the edge of the hood-cap and move it along the rack until further advance of the hood-cap is prevented by the inturned flanges 109 of the rack. The cap-advancing plate is then retracted to starting position. A lever-arm 294, pivoted at its mid section to a bracket 295 secured to the side wall of box portion 42, is attached to the cap-advancing plate 292 by means of a link-member 295. Swinging movement of the lever-arm about its central pivot point will, it is understood, advance and retract the cap-advancing plate 292.

Swinging movement of the lever-arm 294 is provided for through an arrangement operatively connecting the same to the ring-advancing lever-member 218 on the other side of the box portion 42. A disk-plate 296, journaled to a stud 297 projecting from the back wall of the box portion 42, is connected at one end thereof to lever-member 218 by means of a connecting rod 298. The other end of the disk-plate 296 is similarly connected by a rod 299 to the cap-advancing lever-arm 294. It is now seen that the to-and-fro reciprocation of vertical shaft 81 and lever-member 218 is transmitted through connecting rod 298, disk-plate 296 and connecting rod 299, to the cap-advancing lever-arm. Should there be no article in position to be sealed, or should jamming of the ejector-plate 212 take place, the ring-ejector lever-member will remain motionless and the cap-advancing lever-arm will also remain unmoved. By this arrangement, it is seen that caps are moved into sealing position only when ring-ties are being advanced.

An upstanding lug 300 is provided in lever-arm 294, into which a laterally extending screw-bolt 301 is adapted to be screwed. The head of the screw-bolt 301 is so positioned as to strike the upstanding flange 290 of the angle-iron lug during a portion of the swinging movement of lever-arm 294. Referring more particularly to Figs. 25 and 28, it is seen that during the latter part of the plate-retracting movement of lever-arm 294, the head portion of the screw-bolt 301 engages the upstanding flange 290 and tilts the lug backwardly on its pivot-pin. This movement raises the U-shaped member 286 and the air-port closures are raised off from the air-ports. This movement occurs as the piston-head begins its upward air-exhausting stroke. As the lever-arm 294 begins to advance the cap-advancing plate, the head portion of the bolt 301 recedes from the upstanding flange of the angle-iron lug, permitting the valves to seat upon the air-ports. This movement occurs at the beginning of the down-stroke movement of the piston head. By manipulating the screw-bolt 301, it is understood that the valve-raising time interval and also the extent of raising movement of the valves may be regulated and adjusted.

*Operation*

My machine is particularly adapted for sealing milk-bottles, although it is understood that any article to which it is desired to bind pliable material by means of a tie may be packaged or sealed within the scope of this invention. In sealing milk-bottles, for example, the filled bottles are either manually or mechanically placed upon the end of the shelf support 60. Upon the turning of a switch, the motor rotates the main drive-shaft 47, to which the various manipulating elements of the machine are operatively connected.

Referring more particularly to Figure 3, as the slide-bar 70 advances toward the right, each bottle is moved forwardly a distance equal to the distance between the several advancing fingers 72. The bottles slide along the shelf support 60 and roll along the guide-member 90. When slide-bar 70 has advanced forwardly its full distance, the bar begins to retract and the free ends of each finger element 72 slide over the bottle at the rear thereof (the finger element then assuming a position more nearly paralleling the slide-bar). This pivoting movement of the finger elements is permitted by the coil-spring 73 connected to the same. When the finger element has been retracted sufficiently, the end thereof snaps back and the bottle which was formerly to the rear of the finger element is now positioned forwardly thereof. The bottles are each rapidly and successively advanced onto the vertically reciprocable platform 76.

The mechanism for adjusting the relationship of the slide-bar 70 to the vertically reciprocable platform to accommodate bottles of various diameters has already been described. The vertical slot 86 in the casing 87 is cut at such an angle as to advance the slide-bar a certain amount with a corresponding raising of the shelf support. It is understood that the sealing and packing of different shaped packages and containers might require a change in the inclination of the slot. As each bottle is moved onto the vertically reciprocal platform 76, rider arm 113 comes into play to project the platform and the bottle seated thereon upwardly. As the platform moves upwardly, the cap grasping suction head is already positioned under the cap container, as shown in dotted lines Figure 24. Rider arm 113, in raising the platform 76, also raises the post-member 252 resting thereon, which rocks arm 254, drawing the piston-head 250 downwardly. A partial vacuum is immediately created in the upper portion of the air cylinder 247, which vacuum is transmitted to the cap-grasping suction head. The cap-grasping head sucks the lowermost cap into engagement therewith. The lowermost cap separates readily from the superimposed cap, since air is allowed to circulate freely between them and they are kept spaced apart to a certain extent by the pleated formation of the skirt portion of each cap.

As the platform continues to move upwardly, vertical rod 280, begins to draw the base-plate 273 to which the cap-grasping head is attached downwardly. Some time prior to the time when the platform 76 has reached its uppermost movement, the cap-grasping head has moved downwardly the full extent of the slot in the guide-plate 267, piston-head 250 has moved below the air-hole 279 destroying the suction grasp of the cap-grasping head, causing the hood cap to drop upon the rack, and cap-advancing plate 292 has moved the hood cap deposited upon the rack forwardly on the rack and directly over the mouth of the milk-bottle.

Simultaneously with this advance of the hood cap into sealing position, and some time prior to the time at which the platform 76 has reached its maximum upward movement, the ring-feeding means comes into play, provided there is a bottle in position on the shelf-support, ready to be advanced upon the platform and in engagement with the feeler finger. The mechanism for throwing the lever-arm into swinging operation and the safety device permitting the lever-arm to idle on the shaft should jamming of the ejector plate take place have heretofore been described in detail.

Now, assuming a condition of normal operation, the ejector plate 212 will be advanced by the swinging movement of the lever member 218 and the lowermost ring in the ring stack will be advanced into sealing position on the top of the cap-forming cone 104 and into engagement with the twisting spindle. It is understood that these movements all take place while the bottle-raising platform is moving upwardly.

With a hood cap in position on the rack directly over the bottle and a ring tie in position on the cap-shaping cone, as shown in Figure 16, the bottle is raised gradually to pick the hood cap off from the cap rack and to drive it up through the cap-shaping cone. The cap-shaping cone engages the skirted portion of the hood cap and presses the same closely around the mouth of the bottle. Continued upward movement of the platform carries the mouth of the bottle through the ring tie in position on top of the cap-forming cone.

Rocker-arm 178 now comes into play to move the abutment plate 174 downwardly, pivoting the body portion 167 of the anvil member up against the side of the bottle. Rocker-arm 158 now operates to retract the twisting spindle 144, to pull the wire tie taut about the bottle. The anvil member, when swung up into operative position, actually performs three functions. First, the bridge portion 167 thereof engages the side of the bottle and prevents tipping of the bottle while the ring tie is being pulled taut. Secondly, the bridge portion of the anvil member holds that skirted portion of the hood cap not engaged by the ring tie against the neck of the bottle. Thirdly, the bridge portion of the anvil member forms a solid base on which the ring tie rests during the nicking operation.

The twisting spindle is retracted rapidly and before any considerable rotation of the twisting head has taken place. Rider arm 141 now comes into play to rotate gear segment 146 and the twisting spindle 134. As twisting of the wire proceeds, the twisting spindle is permitted to advance gradually, so as to provide for the take-up in the wire due to the twisting thereof. Practically a uniform tensile strain is thus exerted on the wire throughout the twisting operation. Immediately at the end of the twisting operation, rocker-arm 187 comes into play to swing the nicking hammer 169, placing a nick of predetermined depth in the wire adjacent the twisted portion thereof. If the wire has a tendency to break at the nick before it is actually desired to unseal the article, the depth of the nick can be lessened by merely adjusting screws 192. On the other hand, a deeper nick can also be placed in the wire, should circumstances require, by the proper manipulation of these adjusting screws.

As soon as the nick has been placed in the wire, rider arm 141 moves the gear segment 146 in the opposite direction. By this movement, the twisting head is rotated out of engagement with the loop formed on the end of the twisted portion and thus completely disconnected from the wire tie and bottle.

By this time the cam member 112 has rotated sufficiently to permit rider arm 113 to move downwardly, thus dropping the platform 76. As the platform drops, the piston-head 250 moves upwardly, valves 285 raise, and air is forced out from the top section of the air cylinder through air-ports 284. Simultaneously with this movement of the piston head and the lowering of the platform, the cap-grasping suction head moves upwardly along the guide-plate and rotates through 180°, so as to face upwardly. When platform 76 has been dropped into flush position with the shelf support 60, the suction head has been moved up adjacent the lowermost hood cap in the container. As soon as the platform has been moved to its lowermost position, the bottle-advancing fingers come into play to advance the next succeeding bottle onto the platform, and the operations above described are repeated.

As the next succeeding bottle is being advanced onto the platform, it is understood that one or more of the bottle-advancing fingers are operating to move the sealed bottle off and away from the platform 76. For this purpose any desired number of bottle-advancing fingers may be used and the bottle-supporting shelf 60 can be made as extensive as found convenient for the purpose at hand. The sealed articles may be removed from the end of the shelf manually, or mechanical means may be provided for performing this operation.

It is now seen that I have provided a machine which is adapted to package and seal articles or bottles effectively and with despatch. Milk-bottles, for example, have been sealed at the rate of sixty per minute by the use of this machine. The capacity of the machine can be doubled by advancing two rows of bottles at a time and providing duplicate ring-feeding, cap-advancing and ring-tying devices, such as are above described.

My machine is practically fool-proof and if the machine is placed in operation with no articles on the shelf support, the ring-feeding and cap-advancing devices will remain motionless notwithstanding the fact that the main drive-shaft continues to rotate.

The operating parts are made generally adjustable, making the machine adaptable to varied conditions of operation. The cap container is adjustable in elevation and the reciprocative travel of the suction-head can be varied as circumstances may require. Casing portion 100, carrying the pressure disk 131 is likewise vertically adjustable, permitting the holding pressure of the disk to be varied as sealing operations require. The depth of the nick or dent placed in the wire may likewise be varied as conditions require.

As many changes could be made in the arrangement of the operative elements described above, and as many apparently widely different embodiments of this invention could be made without departing from the scope thereof, it is intended that all matter contained in the above description or shown in the accompanying drawings shall be interpreted as illustrative and not in a limiting sense.

What I claim is:

1. In an apparatus of the character described, in combination, means for applying a skirted hood cap or an article to be sealed, means for encircling the skirt of the applied hood cap with a ring tie, means for twisting the tie to bind the hood cap on the article, and means for placing a nick in the tie adjacent the twisted portion to cause the tie to break at the nick when subjected to subsequent twisting.

2. In an apparatus of the character described, in combination, means for applying a skirted hood cap to an article to be sealed, means for encircling the skirt of the applied hood cap with a ring tie, means for twisting the tie to bind the hood cap on the article, means for placing a nick in the tie adjacent the twisted portion, and mechanism for actuating all of said means in predetermined co-relative sequence.

3. A machine for sealing articles, including in combination, means for advancing an article into sealing position, means for applying a skirted hood cap to the article when positioned to be sealed, means for encircling the skirt of the applied hood cap with a ring tie, means for twisting the encircling tie to bind the hood cap on the article, and means for placing a nick in the tie adjacent the twisted portion to cause the tie to break at the nick when subjected to subsequent twisting.

4. A machine for sealing articles, including in combination, means for advancing an article into sealing position, means for applying a skirted hood cap to the article, means for encircling the skirt of the applied hood cap with a ring tie, means for twisting the encircling tie to bind the hood cap on the article, means for placing a nick in the tie adjacent the twisted portion, and mechanism for actuating all of said means in predetermined co-relative sequence.

5. A machine for sealing articles, including in combination, means for advancing articles successively into sealing position, means for applying a skirted hood cap to each article, means for encircling the skirt of each applied hood cap with a ring tie, means for twisting each encircling tie to bind the hood cap on the article, means for placing a nick in the tie adjacent the twisted portion, and mechanism for actuating all of said means in predetermined co-relative sequence.

6. In an apparatus of the character described, in combination, a ring tie support, means for projecting a portion of an article to be tied through a ring tie positioned on said support, and means for twisting said tie to tighten same about the encircled article.

7. In an apparatus of the character described, in combination, a ring tie support, means for disposing a ring tie on said support, means for projecting a portion of an article to be tied through the ring tie positioned on said support, and means for twisting the tie to tighten the same about the encircled article.

8. In an apparatus of the character described, in combination, a ring tie support, means for disposing a ring tie on said support, means for projecting a portion of an article to be tied through the ring tie positioned on said support, means for twisting the tie about the encircled article, and means for placing a nick in the tie adjacent the twisted portion to cause the tie to break on subsequent twisting.

9. In an apparatus of the character described, in combination, a ring tie support, tie twisting means, means for disposing a ring tie on said support and in engagement with the tie twisting means, and means for projecting a portion of an article through the ring tie positioned on said support.

10. In an apparatus of the character described, in combination, a ring tie support, means for applying a hood cap to an article to be tied, means for projecting the hood capped portion of the article through a ring tie positioned on said support, and means for twisting said tie to bind the hood cap to the article.

11. In an apparatus of the character described, in combination, a ring tie support, tie twisting means, means for disposing a ring tie on said support and in engagement with the tie twisting means, means for applying a hood cap to said article, means for projecting the hood capped portion of the article through the ring tie positioned on said support, and means for twisting the tie to bind the hood cap to the article.

12. In an apparatus of the character described, in combination, a ring tie support, means for applying a hood cap to an article to be tied, cap shaping means, and means for projecting the capped portion of the article into the cap shaping means, and through a ring tie positioned on said support.

13. In an apparatus of the character described, in combination, a ring tie support, means for disposing a tie on said support, means for applying a hood cap to the article, cap shaping means in alignment with the ring support, and means for projecting the capped portion of the article into said cap shaping means and through the ring tie positioned on said support.

14. In an apparatus of the character described, in combination, a ring tie support, means for applying a hood cap to an article cap shaping means, means for projecting the hood capped portion of said article into said cap shaping means and through a ring tie positioned on said support, and means for twisting said tie to bind the hood cap to the article.

15. A machine for sealing articles, including in combination, a ring tie support, means for applying a hood cap to the article, cap shaping means, means for projecting the hood capped portion of said article into said cap shaping means and through the ring tie positioned on said support, tie twisting means, and means for actuating said tie twisting means to bind the tie about the article.

16. A machine for sealing articles, including in combination, a ring tie support, tie twisting means, means for disposing a tie on said support and in engagement with the tie twisting means, means for applying a hood cap to the article, means for projecting the hood capped portion of said article into said cap shaping means and through the ring tie positioned on said support, and means for actuating said tie twisting means to bind the tie about the article.

17. A machine for sealing articles, including in combination, a magazine for ring ties, a ring tie support, means for delivering ties successively from the magazine to said support, and means for projecting a portion of the article to be sealed through the ring tie positioned on said support.

18. An article sealing machine, including in combination, a magazine for ring ties, a ring tie support, tie twisting means, means for delivering a tie from the magazine into engagement with the tie twisting means, means for projecting a portion of the article to be sealed through said tie, and means for actuating said tie twisting means to bind the tie about the article.

19. A machine for sealing articles, including in combination, a magazine for ring ties, a ring tie support, tie twisting means, means for delivering a tie from the magazine into engagement with the tie twisting means, means for projecting a portion of the article to be sealed through the ring tie positioned on said support, means for actuating the tie twisting means to bind the tie about the article, and means for placing a nick in the tie adjacent the twisted portion to cause the tie to break on subsequent twisting.

20. A machine for sealing articles, including in combination, a magazine for ring ties, a ring tie support, tie twisting means, means for delivering ties successively from the magazine to said support and into engagement with said tie twisting means, means for applying a hood cap to each article, and means for actuating said tie twisting means to bind each hood cap to its article.

21. A machine for sealing articles, including in combination, a magazine for ring ties, a ring tie support, tie twisting means, means for delivering ties successively from the magazine to said support and into engagement with said tie twisting means, means for advancing articles successively into alignment with said support, means for projecting a portion of each article through a ring tie positioned on said support, and means for actuating said tie twisting means to bind each tie about its article.

22. A machine for sealing articles, including in combination, a magazine for ring ties, a ring tie support, tie twisting means, means for delivering ties successively from the magazine to said support and into engagement with said tie twisting means, means for advancing articles to be tied successively into alignment with said support, means for applying a hood cap to each article so advanced, and means for actuating said tie twisting means to bind each hood cap to its article.

23. A machine for sealing bottles, including in combination, a magazine for ring ties, a ring tie support, tie twisting means, means for delivering a tie from the magazine to said support and into engagement with said tie twisting means, means for advancing a bottle to be sealed into alignment with said tie support, means for applying a hood cap to the bottle so advanced, means for twisting the tie to bind the same about the bottle, and means for placing a nick in said tie adjacent the twisted portion to cause the same to break on subsequent twisting.

24. A machine for sealing bottles, including in combination, a magazine for ring ties, a ring tie support, tie twisting means, means for delivering a tie from the magazine to said support and into engagement with said tie twisting means, means for advancing a bottle to be sealed into alignment with said support, means for applying a hood cap to the article so advanced, cap shaping means in alignment with said tie support, means for projecting the capped portion of the article into said cap shaping means and through the ring tie positioned on said support, and means for twisting said tie to bind the hood cap to the article.

25. In an apparatus of the character described, a shelf support, a wall member along one side thereof, and means located along the other side of the shelf support for advancing an article therebetween, said means including a member reciprocable along said support, and a finger element connected to said reciprocating member and operative to move the article forwardly and to prevent rearward movement of the same by blocking the passage between said finger element and the wall member and means for adjusting the article passage width between said wall member and article advancing means to accommodate articles of various size.

26. In an apparatus of the character described, in combination, a shelf support, and means for advancing an article along said support, said means including a bar reciprocable along said support, a finger element pivoted to said bar and normally projecting laterally from the bar and in the direction of advance movement of the article, a stop element preventing rearward pivoting movement of the finger element beyond a predetermined point and a resilient member normally retaining said finger element against said stop element but permitting said finger element to pivot forwardly when engaged by the article.

27. In an apparatus of the character described, in combination, a shelf support, means for moving articles successively along said support, and means for vertically adjusting said shelf support to accommodate articles of various sizes.

28. In an apparatus of the character described, in combination, a shelf support, article sealing means disposed above said shelf support, means for moving articles successively along said support and to said article sealing means, and means for adjusting the position of said article moving means in relation to said sealing means to accommodate articles of various sizes.

29. In an apparatus of the character described, in combination, a shelf support, article sealing means disposed above said shelf support, means for moving articles successively along said support and to said article sealing means, means for vertically adjusting the shelf support to accommodate articles of various heights, and means for simultaneously adjusting the position of said article moving means in relation to said sealing means to accommodate articles of various diameters.

30. In an apparatus of the character described, in combination, a shelf support, article sealing means disposed above said shelf support, means reciprocable along said shelf support for advancing successive articles into sealing position beneath said sealing means, manually operated means for vertically adjusting the shelf support to accommodate articles of various heights, and means for adjusting the relative position of said article means in relation to said sealing means to accommodate articles of various diameters.

31. In an apparatus of the character described, in combination, a shelf support, article sealing means, means for advancing successive articles along said shelf support and to said article sealing means, a rack and pinion arrangement supporting said shelf and permitting vertical adjustment of the same and means for retaining said shelf in the desired adjusted position.

32. In an apparatus of the character described, in combination, a shelf support, article advancing means reciprocable along said shelf support, and means for reciprocating said advancing means including a vertical shaft, motivating means for rotating said shaft back and forth through a predetermined arc, an arm loosely journalled at one end thereof to said shaft and connected to said advancing means at the other end thereof, and means fixed to said shaft operatively connecting said arm and said shaft, said means having a vertical slot therein through which said arm projects and so shaped as to generally shift the article advancing means relative to said shelf support when vertical adjustment of the shelf support is made.

33. In a machine for sealing articles, in combination, a ring tie support, tie twisting means, means for disposing a tie on said support and in engagement with said tie twisting means, a platform positioned beneath said tie twisting means and vertically reciprocable to project an article positioned thereon through said ring tie resting on said support, means for twisting the tie about the article, and mechanism for actuating said tie disposing means, platform and tie twisting means in predetermined co-relative sequence.

34. In a machine for sealing articles, in combination, a shelf support having an opening therein, a ring tie support disposed above said opening, tie twisting means, means for disposing a tie on said support and in engagement with said tie twisting means, a platform vertically reciprocable through said opening and operative to project a portion of the article positioned thereon through said ring tie, and mechanism for actuating said tie disposing means, twisting means and platform in predetermined co-relative sequence.

35. In an apparatus of the character described, in combination, article tying means, and a device for feeding ring ties to said tying means, said device including a member on which the ring ties are adapted to be threaded, and means for moving the successive ring ties transversely across an end of said member and into engagement with said tying means.

36. In an apparatus of the character described, in combination, article tying means, and a device for feeding successive ring ties to said tying means, said device including a member on which a plurality of ring ties are adapted to be threaded, a plate disposed adjacent one end of said member, and means operative between said plate and the adjacent end of said member for removing successive ties from the member and advancing them successively into engagement with said tying means.

37. A ring feeding device, including in combination, a member on which a plurality of rings are adapted to be threaded, a plate disposed adjacent one end of said member, and means slidable on said plate and positioned between the plate and the adjacent end of said member for removing successive rings therefrom.

38. A ring feeding device, including in combination, a ring carrying member, said member having a beveled end, and means slidable transversely across the beveled end of said member and operative to remove successive rings therefrom.

39. A ring feeding device, including in combination, a ring carrying member, one end of said member being beveled so as to form a cam surface, and means movable transversely across the cam surface of said member and operative to remove the rings successively advanced to the beveled end thereof.

40. A ring feeding device, including in combination, a ring carrying member, a plate normally contacting one end thereof, the plate contacting end of said member being beveled so as to form a cam surface, and means slidable between said plate and the beveled end of said member and operative to separate the same to remove successive rings from said member.

41. A ring feeding device, including in combination, a ring carrying member, one end of said member being beveled to form a cam surface, a plate adapted to normally contact the beveled end of said member and means adapted to engage each ring as it is successively advanced to the beveled end of said member and operative to force said ring against the cam surface of said member to separate said member and plate to permit removal of said ring.

42. A ring feeding device, including in combination, a ring carrying member, one end of said member being beveled to form a cam surface, a plate adapted to normally contact the beveled end of said member and means operative to wedge each ring advanced to the beveled end of said member between said beveled end and said plate to separate the same, and finally to eject the ring therefrom.

43. A ring feeding device, including in combination, a ring carrying member, one end of said member being beveled to form a cam surface, a plate adapted to normally contact the beveled end of said member at one or more points but otherwise so positioned that the heel of said cam surface is raised off from said plate a distance approximately equal to the thickness of the ring being fed, and means operative to wedge said ring between said beveled end and said plate to separate the same, and finally to eject the ring therefrom.

44. A ring feeding device, including in combination, a plate, a ring carrying member, one end of said member being provided with a cam surface having a toe portion and a heel portion, the toe portion of said member normally resting on said plate but the heel portion being raised off from said plate a distance approximately equal to the thickness of the ring being fed, and means operative to wedge said ring between said cam surface and said plate to separate the same, and finally to eject the ring therefrom.

45. In an apparatus of the character described, in combination, article tying means, and a device for feeding ring ties to said tying means, said device including a container for holding said ring ties in stacked alignment, and means for removing successive ties from one end of said container and advancing them successively into engagement with said tying means.

46. A ring feeding device, including in combination, a plate, a container for holding said rings in stacked alignment, the lower end of said container being open and raised off from said plate approximately the thickness of one ring, and an element adapted to slide between the open end of said container and said plate for removing successive rings from said container.

47. A ring feeding device, including in combination, a ring carrying member, said member having a beveled end, a plate disposed adjacent said beveled end, a container for said member spaced from said plate, and means movable between said plate and beveled end and operative to remove successive rings from said member.

48. A ring feeding device, including in combination, a plate, a ring carrying member, one end of said member being provided with a cam surface, the toe portion of said member resting on said plate, a container surrounding said member and spaced from said plate a distance approximately equal to the thickness of the ring being fed, and means slidable between said container and plate and operative to wedge said ring between said cam surface and said plate to separate same, and finally to eject the ring therefrom.

49. In an apparatus of the character described, in combination, article tying means, and a device for feeding ring ties to said tying means, said device including a member on which the ring ties are adapted to be threaded, one end of said member being beveled to form a cam surface, a plate adapted to normally contact the beveled end of said member, a container telescoped over said member and operative to hold said ring ties in stacked alignment, and means operative between said plate and the adjacent beveled end of said member for removing successive ties from the container and advancing them successively into engagement with said tying means.

50. In an apparatus of the character described, in combination, article tying means, a shelf support, means for advancing articles along said support and to said article tying means, a container for ring ties, a device for ejecting rings from said container and placing same successively into engagement with said tying means, and means for throwing said ejector device into operation only when engaged by an article about to be tied.

51. In an apparatus of the character described, in combination, a shelf support, article tying means, means for advancing articles along said shelf support and to said article tying means, a container for ring ties, an ejector member adapted to move ties successively from said container into operative engagement with said tying means, and means for reciprocating said ejector member, said means including a shaft rotatable back and forth through a predetermined arc, and mechanism for throwing said ejector device into operative connection with said rotatable shaft only when engaged by an article about to be tied.

52. In an apparatus of the character described, in combination, article tying means, a container for ring ties, an ejector member adapted to move ties successively from said container and into operative engagement with said tying means, driving mechanism for reciprocating said ejector member and resilient means connecting said driving mechanism and ejector plate, said connecting means being operative to permit said driving mechanism to continue reciprocation should jambing of the ejector member take place.

53. In an apparatus of the character described, in combination, a shelf support, article tying means, mechanism for advancing articles along said support and to said article tying means, a container for ring ties, an ejector member adapted to move ties successively from said container and into operative engagement with said tying means and means for reciprocating said ejector plate, said means including driving mechanism, means for throwing said ejector plate into operation only when engaged by an article about to be tied, and connecting means between said driving mechanism and ejector member operative to permit the driving mechanism to continue reciprocation should jambing of the ejector member take place.

54. In an apparatus of the character described, in combination, article tying means, a container for ring ties, an ejector plate adapted to move ties successively from said container and into operative engagement with said tying means, a drive shaft rotatable back and forth through a predetermined arc, and resilient means operatively connecting said ejector plate to said shaft.

55. In an apparatus of the character described, in combination, article tying means, a container for ring ties, an ejector member adapted to move ties successively from said container and into operative engagement with said tying means, and means for reciprocating said ejector member, said means including a drive shaft, mechanism for rotating said shaft back and forth through a predetermined arc. A coil spring surrounding said shaft and secured thereto at one end thereof and a rocker arm pivotally connected to said ejector member at one end and at its other end secured to the free end of said coil spring, said coil spring being operative to permit said drive shaft to continue reciprocation should jambing of the ejector member take place.

56. In an apparatus of the character described, in combination, means for placing a ring tie about an article to be tied, a device for twisting said tie about the article, said device including a hook element adapted to engage said ring tie, mechanism for retracting said hook element to draw said ring tie taut about the article, mechanism for rotating said hook element to form a twist in said ring tie, and means for permitting said hook element to advance gradually toward the ring tie as the twist is being formed, and a device for placing a nick in said ring tie near the twisted portion thereof.

57. In an apparatus of the character described, in combination, means for placing a ring tie about an article to be tied, and a device for drawing said ring tie taut about the article, said device including a hook element adapted to engage the ring tie, a rocker arm operatively connected to said hook element, and mechanism for operating said rocker arm to retract said hook element.

58. In an apparatus of the character described, in combination, means for placing a ring tie about an article to be tied, and a device for twisting said ring tie about the article, said device including, a shaft, a hook element on the end of said shaft adapted to engage the ring tie and means operative to rotate said shaft a predetermined number of revolutions in one direction to form a twist in said tie, said means also being operative to rotate said shaft in the opposite direction to disengage said hook element from the tie.

59. In an apparatus of the character described, in combination, means for placing a ring tie about an article to be tied, and a device for twisting said ring tie about the article, said means including a hook element adapted to engage the ring tie, driving mechanism for giving said hook element a predetermined number of twisting revolutions, and means for adjusting said driving mechanism to obtain the desired number of twists in said tie.

60. In an apparatus of the character described, in combination, means for placing a ring tie about an article to be tied, and a device for twisting said ring tie about the article, said means including a shaft, a hook element adapted to engage the ring tie, a pinion on said shaft, a second shaft, a gear rotatably mounted on said second shaft and in operative engagement with said pinion, a reciprocating drive member, and means connecting said drive member to said gear, said connecting means being adjustable to vary the angular stroke of said gear and the number of twisting revolutions of said hook member.

61. In an apparatus of the character described, in combination, means for placing a ring tie about an article to be tied, and means for placing a nick in said ring tie, said nicking means including a pivoted anvil member, a nicking hammer pivoted to said anvil member and operating mechanism for rocking said nicking hammer to cause a nicking blow to be struck against said ring tie.

62. In an apparatus of the character described, in combination, means for placing a ring tie about an article to be tied, and means for placing a nick in said tie, said nicking means including a pivoted anvil member, a nicking hammer pivoted to said anvil, a reciprocable drive member, a link connecting said nicking hammer to said drive member, and means associated with said link and drive member permitting adjustment of the nicking hammer in reference to the ring tie to vary the depth of the nick.

63. In an apparatus of the character described, in combination, means for placing a ring tie about an article to be tied, and means for placing a nick in said tie, said nicking means including a pivoted anvil member, a blocking member adapted to be moved against said anvil member to finally hold the same in nicking position, a nicking hammer pivoted to said anvil member, and operating mechanism for moving said blocking member into anvil blocking position and for rocking said nicking hammer in predetermined co-relative sequence.

64. In an apparatus of the character described, in combination, means for placing a ring tie about an article to be tied, and a device for twisting said tie about the article, said device including a shaft, a hook element adapted to engage the ring tie mounted at one end of said shaft, a rocker arm operatively connected to said shaft and adapted to retract the same to draw said ring tie taut about the article, a pinion mounted on said shaft, and a gear element operative to rotate said pinion and shaft a predetermined number of twisting revolutions, and driving mechanism for operating said rocker arm and gear element in predetermined co-relative sequence.

65. In a machine for sealing articles, in combination, a container adapted to hold a plurality of article sealing caps in stacked alignment, a suction device for removing said sealing caps successively therefrom, means for advancing said sealing caps successively into article sealing position, means for twisting a tie about each sealing cap positioned on an article, and mechanism for operating said suction device, cap advancing means and twisting means in predetermined co-relative sequence.

66. In a machine for sealing articles, in combination, a container adapted to hold a plurality of article sealing caps in stacked alignment, a cap supporting rack, means for removing said sealing caps from said container and placing them successively on said rack, a reciprocable plate movable along said rack and adapted to advance each successive cap into article sealing position, and mechanism for operating said cap removing means and plate in predetermined co-relative sequence.

67. A machine for sealing articles including in combination, a container adapted to hold a plurality of article sealing caps in stacked alignment, a cap supporting rack, and a suction device for removing said caps successively from said container and placing them on said rack, said device including a suction cylinder, a suction head in communication with said cylinder, driving mechanism for reciprocating said head from cap removing position to cap depositing position, and means operative to rotate said head during its reciprocating motion.

68. In a machine for sealing articles, in combination, a container adapted to hold a plurality of article sealing caps in stacked alignment, a cap supporting rack, a suction device for removing said caps from said container and placing them successively on said rack, and a reciprocable plate movable along said rack and adapted to advance each successive cap into sealing position, said suction device including a suction cylinder, a suction head in communication with said cylinder, driving mechanism for reciprocating said head from cap removing position to cap depositing position, an exhaust valve for said cylinder, and adjustable means operative to close said valve at the beginning of the cap advancing movement of said plate.

69. In an apparatus of the character described, in combination, a container adapted to hold hood caps having skirt portions, means for removing said caps successively from said container, means for placing said caps over successive articles to be sealed, with the skirt portions encircling the article, and means for twisting a wire tie about the skirt portion of each successive cap positioned over an article to bind the cap in place on the article.

This specification signed this 10th day of April, 1929.

HENRY B. FOULDER.